(12) United States Patent
Drost et al.

(10) Patent No.: US 7,434,411 B2
(45) Date of Patent: Oct. 14, 2008

(54) DROPLET DESORPTION PROCESS AND SYSTEM

(76) Inventors: Kevin M. Drost, Oregon State University Department of Mechanical Engineering, 204 Rogers Hall, Corvallis, OR (US) 97331-6001; Vinod Narayanan, Oregon State University Department of Mechanical Engineering, 204 Rogers Hall, Corvallis, OR (US) 97331-6001; Deborah V. Pence, Oregon State University Department of Mechanical Engineering, 204 Rogers Hall, Corvallis, OR (US) 97331-6001

(*) Notice: Subject to any disclaimer, the term of this patent is extended or adjusted under 35 U.S.C. 154(b) by 245 days.

(21) Appl. No.: 11/014,114

(22) Filed: Dec. 15, 2004

(65) Prior Publication Data
US 2005/0126211 A1 Jun. 16, 2005

Related U.S. Application Data

(60) Provisional application No. 60/529,868, filed on Dec. 15, 2003.

(51) Int. Cl.
*F25B 15/00* (2006.01)
(52) U.S. Cl. ............................. 62/101; 62/476
(58) Field of Classification Search .................. 62/101, 62/476, 497
See application file for complete search history.

(56) References Cited

U.S. PATENT DOCUMENTS

| | | | |
|---|---|---|---|
| 5,811,062 A | 9/1998 | Wegeng et al. | |
| 6,126,723 A | 10/2000 | Drost et al. | |
| 6,415,860 B1 | 7/2002 | Kelly et al. | |
| 6,672,502 B1 | 1/2004 | Paul et al. | |
| 6,688,631 B1 | 2/2004 | Andre | |
| 6,793,831 B1 | 9/2004 | Paul et al. | |
| 6,802,364 B1* | 10/2004 | Garimella | 165/116 |
| 2002/0144600 A1 | 10/2002 | TeGrotenhuis et al. | |
| 2003/0167692 A1* | 9/2003 | Jewell et al. | 48/197 FM |

* cited by examiner

*Primary Examiner*—Melvin Jones
(74) *Attorney, Agent, or Firm*—Klarquist Sparkman LLP

(57) ABSTRACT

Microchannel or fractal plate desorption retains the advantage of high-flux, thin-film desorption without using membranes and allows for lightweight, compact desorbers for either LiBr and water or ammonia and water. Working embodiments of the process comprise providing a droplet desorber, feeding a multicomponent fluid mixture comprising at least a first fluid and a second fluid to the desorber, and performing a desorption process on the mixture using the desorber. The primary fluid mixtures used were ammonia and water, and aqueous lithium bromide. Various working embodiments of desorbers are disclosed, including several desorbers comprising plural, substantially straight, substantially parallel microchannels in an array, and a fractal plate desorber, such as a bifurcating fractal plate. The method also comprises separating a first fluid from a second fluid using a separation process, such as gravity separation, wicking separation, electro hydrodynamic separation, centrifugal separation, cyclone separation, and combinations thereof. Disclosed embodiments of the system useful for performing the desorption process include a desorber; a manifold positioned to deliver a mixture of fluids to the desorber, the mixture comprising a refrigerant; a heater, including thin film deposited heaters, operatively associated with the desorber; and a separator downstream of the desorber for separating a refrigerant vapor from a liquid fraction remaining from the mixture following vaporization of the refrigerant. Such systems also typically include an expansion valve through which the refrigerant flows, where the pressure is reduced and the refrigerant boils at a low temperature, and may include additional optional devices useful for practicing the desorption process, such as pumps, fluid collectors, etc.

29 Claims, 25 Drawing Sheets two 5-channel desorbers

DROPLET DESORPTION PROCESS AND SYSTEM

CROSS REFERENCE TO RELATED APPLICATION

This application claims the benefit of the earlier filing date of U.S. Provisional Application No. 60/529,868, filed on Dec. 15, 2003. The entire disclosure of provisional application No. 60/529,868 is considered to be part of the disclosure of the accompanying application and is incorporated herein by reference.

FIELD

The present application concerns desorbers, and systems comprising desorbers, for performing an absorption cycle, with particular embodiments including microchannel-array or fractal-branching droplet desorbers that facilitate droplet desorption processes for various multicomponent fluid mixtures, such as aqueous lithium bromide (LiBr) and ammonia cooling cycle fluid mixtures.

BACKGROUND

I. Introduction

The absorption cycle is one approach to heat-actuated cooling and is similar to a vapor compression cycle cooler except that the mechanical compressor in the vapor compression cycle is replaced with a chemical compressor. Chemical compressors typically have five components: an absorber, a desorber, an expansion valve, a regenerative heat exchanger and a pump. In the desorber, a mixture of fluids is heated and the refrigerant is desorbed from the mixture as a vapor. The refrigerant is at a high pressure and is condensed, rejecting heat to the surroundings. The refrigerant then passes through the expansion valve, where the pressure is reduced and the refrigerant boils at a low temperature. Heat is taken from the load and used to boil the refrigerant to form refrigerant vapor. The refrigerant vapor is then absorbed into the circulating fluid. The mixture is pressurized by a pump and returned to the desorber. Because the mixture is an incompressible liquid when it is pressurized, the pump work typically is $1/100$ of the electric power required to operate a similar mechanical compressor. Heat is added to the system in the desorber and heat is rejected from the system in the condenser and absorber. A schematic diagram of an absorption heat pump is shown in FIG. 1.

The absorption cycle may be classified by fluid combination and cycle arrangement. The most widely used fluid combinations are (1) lithium bromide (LiBr) and water ($H_2O$), where water is the refrigerant, and (2) water and ammonia, where ammonia is the refrigerant. Typically, LiBr/$H_2O$ systems are used where low temperature (<150° C.) thermal energy is available to drive the cycle. Ammonia and water systems are used for heating applications where the system is rejecting heat to surroundings that can be at a high temperature (such as automotive cooling) and applications where high efficiency is critical. In a water and ammonia absorption heat pump, the desorber is operated at a sufficiently high pressure to insure that the temperature of the water is below the saturation temperature; consequently, the water will not boil during the desorption process.

Macroscale absorption heat pumps using falling films are commercially available and are widely used for stationary cooling applications, particularly where waste heat is available. The U.S. Department of Energy has sponsored a large-scale, multi-year research program focused on improving the performance of heat-actuated heat pumps. As part of these development efforts significant research has been focused on improving the performance of falling films absorbers and desorbers.

Gas/liquid contacting (absorption or desorption) is critical for absorption-based, heat-actuated heat pumps. However, for known systems that use thin liquid films, the size of the gas/liquid contactor is fundamentally limited by diffusion in the liquid film where the diffusivity in the gas phase can be three to five orders of magnitude greater then in the liquid phase. Falling films are inherently orientation dependent and typically result in liquid film thicknesses on the order of 1 mm. Reducing the thickness of the liquid film in a gas/liquid contactor from 1 mm to 100 microns would increase mass transfer by a factor of about 100. When the resistance to mass transfer in gas desorption and absorption is dominated by diffusion in the liquid phase the use of extremely thin films can radically reduce the size of a gas desorber or absorber.

But, using a falling film results in an absorption heat pump that is orientation sensitive. A small deviation from the design orientation prevents the falling film from properly forming. As a result, the heat pump does not function properly.

Recent developments suggest that the performance of absorbers and desorbers in a heat-actuated heat pump can be significantly enhanced by using a membrane with many small diameter pores to prevent mixing between a gas and liquid while allowing the gas and liquid to be in contact. When the contactor is properly designed, surface tension prevents the liquid from entering the pores while the pores provide a path for gas to diffuse to the liquid surface. The contactor then can be used to form a film with a thickness of less than 100 microns while allowing gas/liquid contact.

While there has been significant progress in the development of a lithium bromide and water absorption cooler for manportable military applications, most civilian applications require the use of ammonia and water. Lithium bromide systems cannot be used for space heating (the refrigerant is water and would freeze when operating at low temperature) or automotive cooling where the high heat rejection temperature prevents the use of lithium bromide and water. The desorber in an ammonia and water system operates at a temperature (≈250° C.) that is sufficiently high to prevent the use of membranes. Therefore, an alternative compact desorption scheme is needed before microtechnology-based, heat-actuated heat pumps can be successfully applied to applications that require ammonia and water for the heat pump working fluids.

Aqueous lithium bromide and ammonia-based heat pumps or refrigeration systems that use thin liquid films are known in the patent literature. For example, U.S. Pat. No. 5,811,062 describes embodiments of a micro-device useful for conducting chemical separations and conversions, including any exchange of a compound or element from one solvent to another where the solvents may be liquid or gas or both, e.g., an absorption cycle refrigeration system. Example 3 of the '062 patent concerns gas absorption into a liquid, e.g., ammonia vapor absorbed into liquid water. Ammonia was absorbed into the water within the liquid film on the microporous contactor. The ammonia flow rate varied from 0-4 grams/minute with water flow rate ranging from 0-33 grams/minute.

Several alternatives to falling films also have been investigated. These alternatives include desorption from liquid films on spinning disks, and mechanically constrained thin films. Spinning disks have been shown to significantly reduce liquid film thickness, but this approach also is orientation dependent. When compared to conventional falling film absorption and desorption, the mechanically-constrained, ultra-thin-film technology has the potential for a striking improvement in performance. With a mechanically-constrained, ultra-thin film of water preliminary results suggest that ammonia can be absorbed in water at a rate that will produce between 10 and 30 W/cm$^2$ of thermal energy (the heat of condensation in the absorption process). This is an extraordinary absorption rate that exceeds the performance of conventional absorbers by more than a factor of 10. This level of performance offers a ten-fold reduction in the size of a conventional absorption heat pump.

II. Microchannel Arrays Made by Laminate Architecture

Microchannel arrays useful for practicing aspects of embodiments disclosed by the present application can be made using laminate architecture. Methods for making microchannel arrays using laminate architecture are described in Paul et al.'s U.S. Pat. Nos. 6,672,502 and 6,793,831, which are incorporated herein by reference.

III. Fractal Plates

Fractal plates also are described in applicant's pending U.S. Pat. No. 6,688,381, which also is incorporated herein by reference.

SUMMARY

Microchannel or fractal plate desorption retains the advantage of high-flux, thin film desorption without using membranes and allows for lightweight, compact desorbers for use with multiple component fluids useful for a variety of applications, such as cooling processes. Examples of multiple component fluids useful in cooling processes include, but are not limited to, lithium bromide and water; ammonia and water, and lithium bromide, ammonia and water. As an example, the size of a microchannel desorber can be estimated based on previously published research on microscale combustion systems demonstrating that heat fluxes up to 30 W/cm$^3$ can be generated between combustion products and an evaporating fluid. Conservatively assuming that the microchannel desorber can attain a heat flux of 10 W/cm$^3$, the desorption stack for a 3 kW automotive cooler would be approximately 300 cm$^3$ or a cube with dimensions of 7 cm by 7 cm by 7 cm.

Desorber embodiments are designed to include channels that facilitate droplet desorption. Without being limited to a particular theory of operation, it currently is believed that microchannel arrays that facilitate fluid slug flow also facilitate droplet desorption. Slug flow generally refers to a multiphase flow regime characterized by a series of liquid plugs (slugs) separated by gas pockets.

Two exemplary embodiments of a desorber are described in this application:

Straight Parallel Channel Desorber—This approach is similar to that shown in FIG. 2 and involves a header that distributes a multi-component fluid mixture to a number of parallel straight channels. The channels are heated and the volatile component vaporizes and accelerates the droplets out of the tube.

Disk Shaped Fractal Channel Desorber—The second approach uses a fractal desorber (one embodiment of which is illustrated in FIG. 17) similar to the fractal devices previously disclosed by Professor Deborah Pence in U.S. Pat. No. 6,688,381, incorporated herein by reference. A fractal-like branching microchannel network, which mimics natural flow network geometries, has been shown to have heat transfer capabilities comparable to a straight microchannel heat sink, but without the large pressure drop. An ammonia-water desorber/separator that uses a fractal-like branching microchannel network desorber therefore was proposed. The high concentration, multi-component mixture inlet is located in the center of a disk. The back of the disk is heated by combustion products and the front of the disk has a fractal branching pattern of microchannels etched or machined into the disk. Fluid typically passes from relatively large channels to progressively smaller channels. For example, large channels take the fluid radially from a fluid inlet in the center of the disk to multiple smaller channels, with successive branches leading to the smallest channels located at the external edge of the disk. Droplets are generated in the branching channels and expelled out radially from the smallest channels located at the edge of the disk. Because this geometry results in increasing flow area and a large number of smallest channels this approach may be less susceptible to phase-change-induced flow maldistribution than the straight parallel channel desorber.

Using multiple microchannel arrays for droplet desorption is not a simple extension of prior technology. Multiple channels likely are required to desorb large quantities of refrigerant. With multiple channels, there is the potential for flow maldistribution caused by vapor bubbles blocking some channels and forcing the mixture through a small number of unblocked channels. Moreover, the effectiveness of fluid separation techniques, such as gravity or EHD separation, needed to be determined. And, while described embodiments of the desorber may not be used at the saturation temperature for water, the partial pressure of water will be sufficiently high for some water to evaporate while ammonia is being desorbed. This is a typical problem for ammonia and water absorption heat pumps and often requires a second separation process where the water vapor is condensed out of the ammonia.

Working embodiments of one disclosed method comprise providing a droplet desorber, feeding a multicomponent fluid mixture comprising at least a first fluid and a second fluid to the desorber, and performing a desorption process on the mixture using the desorber. Various fluid mixtures can be used including, without limitation, ammonia and water; lithium bromide and water; lithium bromide, zinc bromide and methanol; sodium hydroxide and water; lithium chloride and water; lithium nitrate, potassium nitrate, sodium nitrate and water; and combinations thereof. The primary fluid mixtures useful for commercial embodiments are ammonia and water, lithium bromide and water, and combinations thereof. Desorbers comprising plural, substantially straight, substantially parallel microchannels in an array, and a fractal plate desorber, such as a bifurcating fractal plate, were used in particular working embodiments. The method also comprises separating a first fluid from a second fluid using a separation process, such as gravity separation, wicking separation, electro hydrodynamic separation, centrifugal separation, cyclone separation, and combinations thereof.

Embodiments of a system useful for performing disclosed embodiments of the desorption method also are described. Certain disclosed system embodiments comprised a desorber; a manifold positioned to deliver a mixture of fluids to the desorber, the mixture comprising a refrigerant; a heater, including thin film deposited heaters, operatively associated with the desorber; and a separator downstream of the desorber for separating a refrigerant vapor from a liquid fraction remaining from the mixture following vaporization of the refrigerant. Such system embodiments also typically include an expansion valve through which the refrigerant flows, where the pressure is reduced and the refrigerant boils at a low temperature. Disclosed system embodiments also may include additional optional devices, such as pumps, fluid collectors, etc.

Certain of the mixtures used in the desorbers are corrosive, such as the ammonia and water mixture. For such mixtures, the selection of materials useful for constructing the system components can be based, at least in part, on resistance to the corrosive material(s). For the ammonia water system, working embodiments of the system have been constructed from metals, particularly stainless steel, such as Stainless 304, 314, 316, and combinations thereof. However, other materials also can be used, such as polymeric materials, one example being TEFLON.

DETAILED DESCRIPTION

I. Introduction

The key to applying microtechnology-based absorption cooling to civilian applications is the development of a compact desorption scheme that does not depend on membranes for the formation of thin films. Certain of the presently disclosed embodiments concern microchannel or fractal plate desorption followed by a separations process using, for example, gravity or electro hydrodynamic (EHD) separation techniques. Microchannel or fractal plate desorption reduces the diffusion lengths for heat and mass transfer to the width of the channel (10 to 100 microns), which provides performance that is comparable to a membrane-constrained, thin-film desorber having a film thickness on the order of 100 microns (Drost, 1997a). Microchannel and fractal desorption enables the deployment of small, heat-actuated absorption heat pumps for distributed space heating and cooling applications, heat-actuated automotive air conditioning, and manportable absorption cooling units. Absorption heat pumps using water or ammonia as the refrigerant will not contribute to ozone depletion or green house gas loading.

Two exemplary embodiments of a desorber, a substantially straight, substantially parallel microchannel desorber and a disk-shaped, fractal channel desorber, are discussed in further detail below.

II. Microchannel Droplet Desorption

Figure 1:
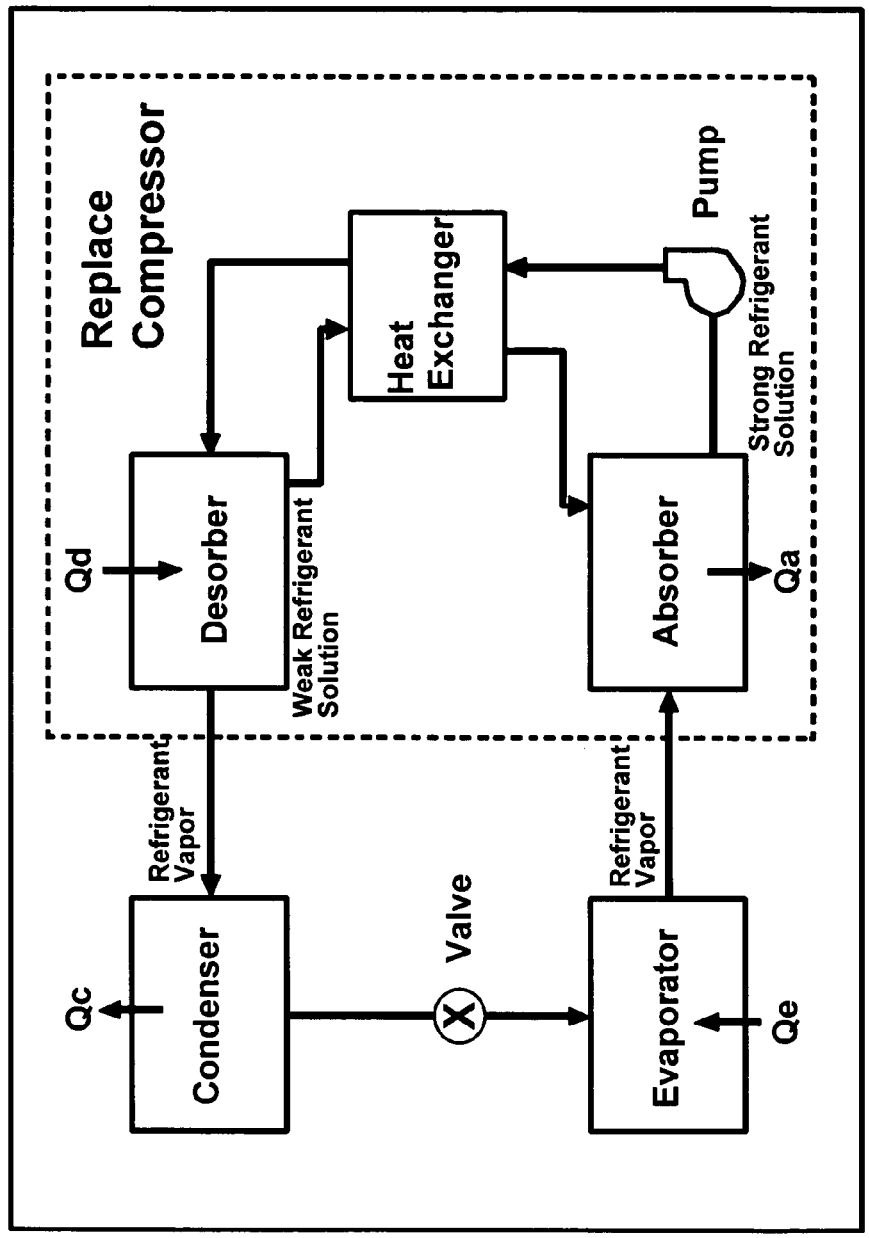
FIG. 1 is a schematic diagram of one embodiment of an absorption-cycle heat pump.
Figure 2:
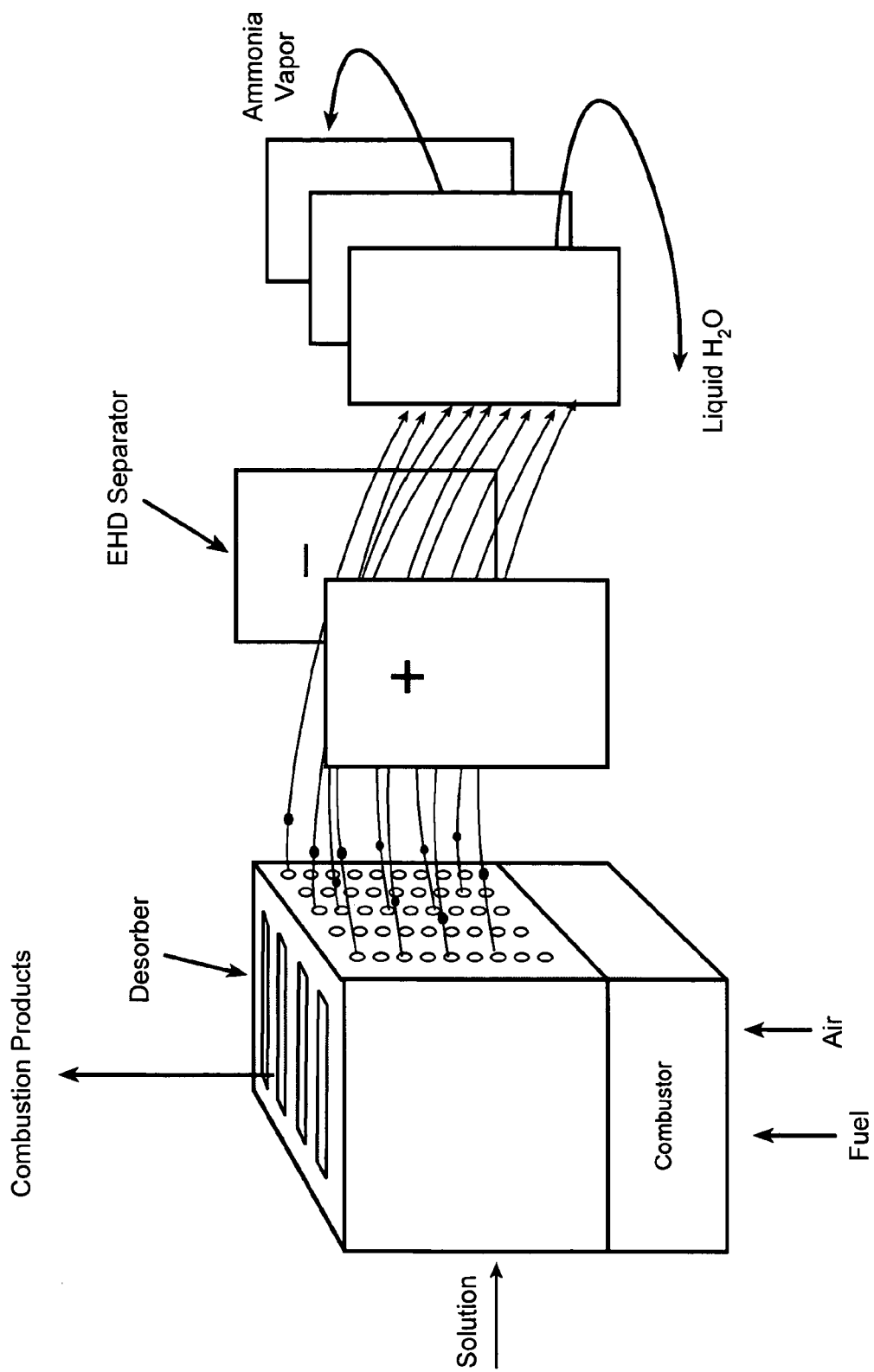
FIG. 2 is a schematic diagram illustrating droplet desorption with electro hydrodynamic phase separation.

In mechanically-constrained, ultra-thin-film desorbers, the membrane serves two functions. First, it forces the film to be extremely thin. Second, it separates the vapor refrigerant from the liquid solution. The need for the membrane can be eliminated by separating these processes. A desorption mechanism for LiBr—$H_2O$ solution based on evaporation of the volatile phase ($H_2O$) in microchannels has been evaluated. The scheme is illustrated in FIG. 2. With reference to FIG. 2, a desorption system 10 comprised a desorber 12 effectively associated with combustor 14. The system further comprises an electro hydrodynamics separator 16. It was expected that under certain geometrical, flow and heat flux conditions, an appropriate flow regime (either a bubbly flow or a plug/slug flow) would develop in these microchannels with pure refrigerant ($H_2O$) in the vapor phase and a concentrated salt solution of LiBr—$H_2O$ in the liquid phase, permitting desorption of refrigerant from the transport fluid. The physics involved is that of flow boiling in a microchannel. Two-phase flow in microchannels is an active area of research. The various flow regimes that are clearly distinguished in macro-channel flow boiling are still open to debate in micro-channel flows. Little information is available for flow boiling of mixtures in microchannels.

1. Droplet Desorption in a Single Micro-Channel

Desorption of water from the LiBr—$H_2O$ mixture in a heated micro-channel was demonstrated initially to obtain preliminary estimates of desorption rates.

Single-Channel Desorption with Gravity Separator

Single-channel desorption with gravity separation was performed to obtain estimates of refrigerant vapor flux for different flow rates, inlet concentrations, and heat flux rates in the absence of additional effects anticipated in a multiple channel desorber, such as fluid dynamic and thermal interactions within and at the exit of the channel array. Another parameter of interest was the pressure drop across the single microchannel. Flow visualization studies on the single microchannel desorber were performed. Furthermore, desorption in a single microchannel was used to estimate the number of channels required to design a high refrigerant flux desorber, and its approximate dimensions.

2. Droplet Desorption in a Multiple Microchannel Desorber with a Gravity Separator The feasibility of multiple channel droplet desorption with a gravity separator was evaluated. For commercial applications, multiple channel configurations likely will be necessary.

A 10-channel desorber was used to evaluate the effect of multiple parallel channels on the desorption process and to supplement measurements obtained using a single channel desorber. The channel spacing was 10-times the channel width to ensure that the jet-to-jet interactions at the exit of the desorber would be minimal. Thus, the two main anticipated microchannel interaction effects—those occurring within the microchannels and those occurring at the jet exit—were independently studied. The collection of the concentrated solution was performed using a gravity separator.

3. Multiple Microchannel Desorber and Separator

The design and fabrication of a desorber with a gravity separator design was performed for integration in a LiBr/H$_2$O test loop to demonstrate droplet desorption at the design operating conditions assumed to exist in a man-portable cooler.

4. Theory

This section provides details of the analysis of the desorption process, and includes details of the thermodynamic property evaluation. A software program was developed using LabVIEW software to determine the ideal refrigerant flow rates and enthalpies of the process. Such an analysis assumes an equilibrium process. In reality, desorption occurred within the microchannel, and the separation occurred at the exit of the desorber, in the separations chamber.

Figure 3:
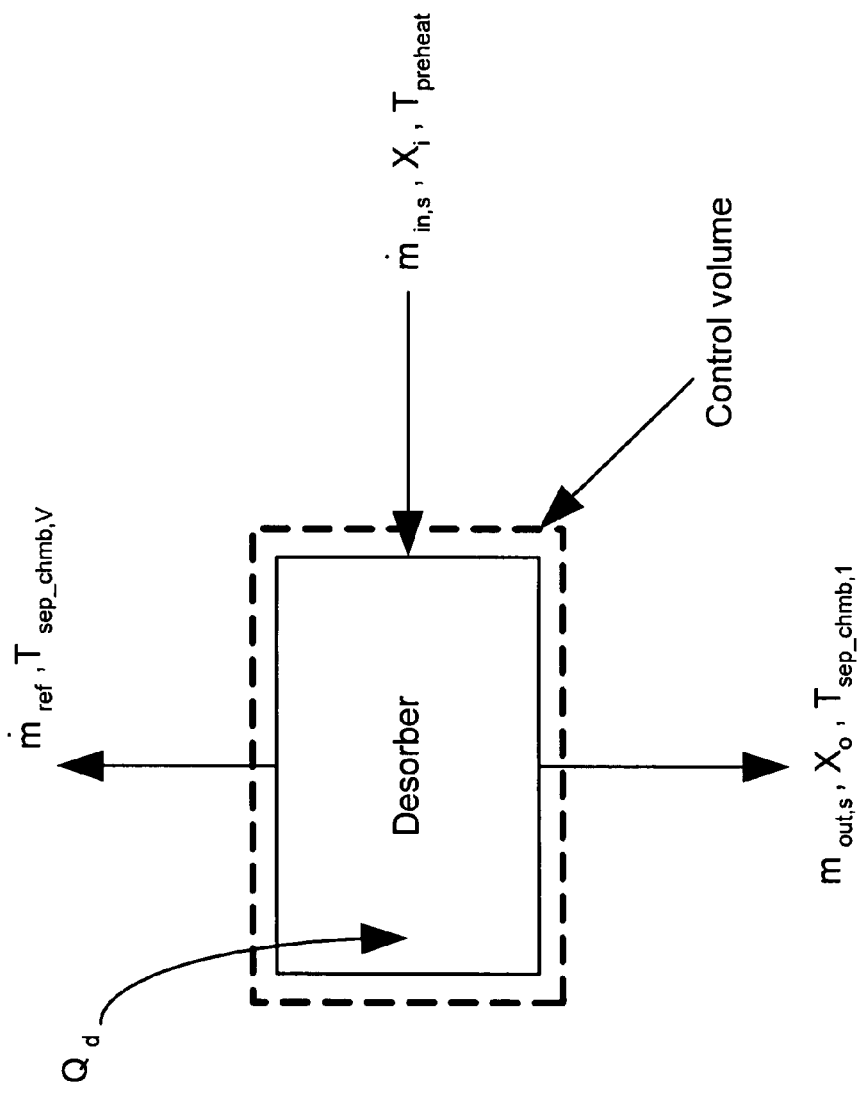
FIG. 3 is a schematic diagram illustrating an ideal desorption process.

Consider a control volume around the microchannel desorber alone, as shown in FIG. 3. Low concentration aqueous LiBr enters the desorber at an inlet temperature of $T_{preheat}$ that is lower than the saturation temperature at the inlet pressure. Thermal energy is supplied to the control volume, resulting in desorption, and consequently, two exit streams: 1) a concentrated LiBr—H$_2$O solution; and 2) a refrigerant in the vapor state. The overall mass balance for this system provides an estimate of the refrigerant flow rate.

$$\dot{m}_{ref} = \dot{m}_{in,s} - \dot{m}_{out,s} \quad (1)$$

The species mass balance of LiBr is given by $$\dot{m}_{in,s} x_i = \dot{m}_{out,s} x_o \quad (2)$$

Combining Eqs (1)-(2) provides a second estimate of the refrigerant flow rate, with the additional assumption that the refrigerant stream does not contain LiBr species. This assumption has been verified to be valid in the preliminary experiments. Thus, $$\dot{m}_{ref} = \dot{m}_{in,s}\left(1 - \frac{x_i}{x_o}\right) \quad (3)$$

Equivalently, Equation 3 can be written in terms of the exit stream flow rate as $$\dot{m}_{ref} = \dot{m}_{out,s}\left(\frac{x_o}{x_i} - 1\right) \quad (4)$$

Equations 1, 3, and 4 provide three estimates of the refrigerant vapor flux. An energy balance on the system provides a means to determine the ideal (hence, minimum) thermal energy rate that needs to be supplied to the microchannel for desorption, $$\dot{Q}_{d,id} = \dot{m}_{ref} h_{ref,v,T_{sat}} + \dot{m}_{out,s} h_{out,v,T_{sat}} - \dot{m}_{in,s} h_{out,s,T_{preheat}} \quad (5)$$

5. Thermodynamic Property Evaluation

Thermodynamic properties were calculated using literature-published equations or curves. The inlet LiBr mass concentration was estimated by measuring density and temperature of the unheated LiBr using the Coriolis flowmeter using $$x = a + (b/T) + c\rho + (d/T^2) + e\rho^2 + f(\rho/T) + (g/T^3) + h\rho^3 + i(\rho^2/T) + j(\rho/T^2) \quad (6)$$

where the coefficients in Equation 6 are provided in Table 1. Equation 6 was obtained by a modification of a second order equation relating density to a known concentration and temperature.

TABLE 1

| Coefficient Values for Equation 6 | |
|---|---|
| a | −348.273 |
| b | −34468.2 |
| c | 0.678594 |
| d | 6.92E+06 |
| e | −0.00036 |
| f | 5.467374 |
| g | −3.47E+08 |
| h | 6.56E−08 |
| i | 0.001658 |
| j | −1492.87 |

The viscosity at the preheat temperature and density was obtained using the relation provided below.

$$\mu \cdot 10^3 = \exp\Bigg(-494.122 + 16.3967 \cdot \left(\frac{\rho}{1000}\right) - 0.14511 \cdot \left(\frac{\rho}{1000}\right)^2\Bigg) + \frac{\left(28606.4 - 934.568 \cdot \left(\frac{\rho}{1000}\right) + 8.52755 \cdot \left(\frac{\rho}{1000}\right)^2\right)}{T} + \left(70.3848 - 2.35014 \cdot \left(\frac{\rho}{1000}\right) + 0.0207809 \cdot \left(\frac{\rho}{1000}\right)^2\right) \cdot \ln(T) \quad (7)$$

Density at the inlet preheat temperature was evaluated using $$\rho = A + B \cdot T_s + C \cdot T_s^2 \quad (8)$$

where the coefficients are functions of concentration and are determined by $$A = (10976.3 + 0.71244 \cdot x + 2.21446 \cdot x^2) \cdot 10^{-4}$$

$$B = (6796.2 - 148.247 \cdot x - 0.89696 \cdot x^2) \cdot 10^{-7} \text{ and}$$

$$C = (-350.97 - 324.312 \cdot x + 4.97020 \cdot x^2) \cdot 10^{-10} \quad (9)$$

The solution specific enthalpy was calculated using the following equation.

$$h_s = F + G \cdot T_s + H \cdot T_s^2 \quad (10)$$

where $T_s$ refer of the preheat temperature for the inlet solution enthalpy, and to the solution saturation temperature at the corresponding pressure, $P_{sat}$, for the exit solution stream. The saturation temperature is estimated using $$T_s = A \cdot T_{ref} + B \quad (11)$$

The refrigerant saturation temperature is given by $$T_{ref} = \frac{-2 \cdot E}{D + \{D^2 - 4 \cdot E \cdot [C - \log(P_{sat})]\}^{0.5}} - 459.72 \quad (12)$$

The coefficients A-H used in Eqs. 7-10 are provided in Table 2.

TABLE 2

Constant Values for Equations 8-10.

$A = -2.00755 + 0.16976 \cdot x - (3.133362 \cdot 10^{-3}) \cdot x^2 + (1.97668 \cdot 10^{-5}) \cdot x^3$
$B = 321.128 - 19.322 \cdot x + 0.374382 \cdot x^2 - (2.0637 \cdot 10^{-3}) \cdot x^3$
$C = 6.21147$
$D = -2886.373$
$E = -337269.46$
$F = -1015.07 + 79.5387 \cdot x - 2.358016 \cdot x^2 + 0.03031583 \cdot x^3 - (1.400261 \cdot 10^{-4}) \cdot x^4$
$G = 4.68108 - (3.037766 \cdot 10^{-1}) \cdot x + (8.44845 \cdot 10^{-3}) \cdot x^2 - (1.047721 \cdot 10^{-4}) \cdot x^3 + (4.80097 \cdot 10^{-7}) \cdot x^4$
$H = (-4.9107 \cdot 10^{-3}) + (3.83184 \cdot 10^{-4}) \cdot x - (1.078963 \cdot 10^{-5}) \cdot x^2 + (1.3152 \cdot 10^{-7}) \cdot x^3 - (5.897 \cdot 10^{-10}) \cdot x^4$ The specific enthalpy of the refrigerant is provided by the following equation.

$$h_{ref} = ((0.00274 \cdot T_{ref} - 0.989805) \cdot P_{sat} + (0.44942 \cdot T_{ref} + 1060.8)) - (1.001 \cdot T_{ref} - 32.05) \quad (13)$$

6. Apparatus and Instrumentation

A. Material Selection

Material compatibility was considered in the design of all components. For example, LiBr solution is a highly corrosive aqueous salt. Most regular metals react with LiBr, and in general, manufacturers provide no information on the compatibility metal components with LiBr. Thus, different materials were tested to evaluate various factors, including chemical compatibility, temperature compatibility as certain parts had to withstand high temperatures in the heated section of the flow loop, etc. Thus, most plastics such as TEFZEL® or PEEK® that were chemically resistant to LiBr could not be used in the heated section due to operating temperature constraints. In general, haste alloy C and Inconel were chemically resistant to LiBr, while titanium and stainless steel 316 (in that order) were fairly resistant. In general, all unheated components of the can be made of polymeric materials, while titanium or Inconel tubing was used for the heated parts. For certain fittings, stainless steel 316 was selected.

To ensure that the components remained operational they were regularly rinsed with deionized water and air. Components of the test section generally were fabricated out of Teflon due to its high-temperature, thermal insulation, and chemical resistance properties. Three test apparatuses were used to perform all tasks. Most parts were fabricated for interchangeable use.

B. Single Microchannel Desorber Test Section

Figure 4:
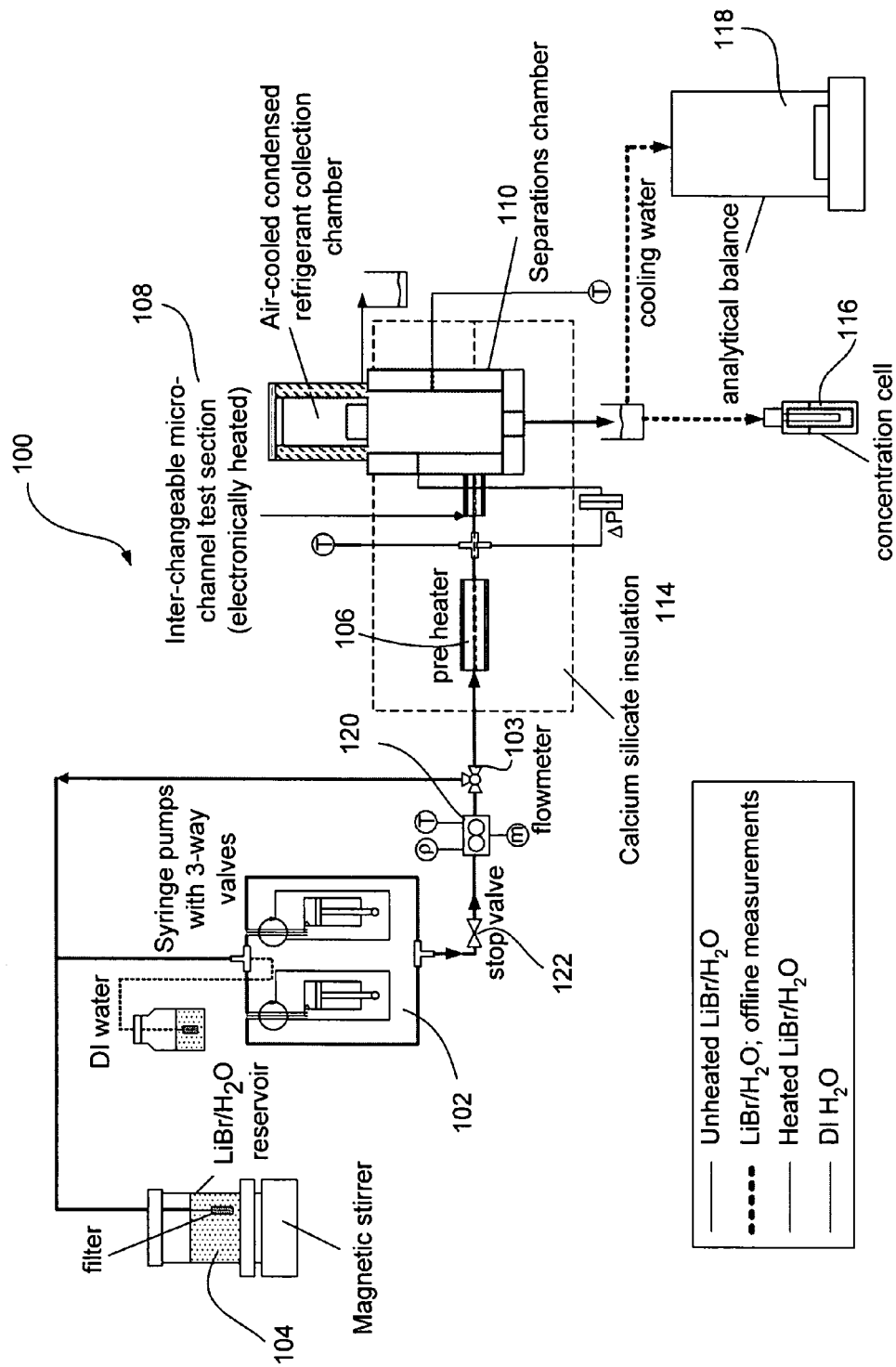
FIG. 4 is a schematic diagram illustrating a lithium bromide/water single-channel desorber system.

FIG. 4 provides a schematic of a test section 100 used for one embodiment of a single microchannel desorber. Test section 100 consists of a dual syringe pump 102 controlled by a PC (not shown) through the serial port using a LabVIEW program. Dual syringe pump 102 provided a continuous flow rate.

The syringe pumps infused LiBr from a stirred reservoir 104, and discharged a constant volumetric flow rate of solution. For a flow rate of 0.75 grams/minute of solution, each syringe stroke lasted for approximately 33 minutes. The discharge stroke of each pump was followed by a faster infusion stroke. A 3-way switching valve 103 controlled the fluid path, either back to the reservoir 104 while mixing the proper concentration, or to a heated channel for testing. Pre-heater 106 consisted of an aluminum cylinder with a band heater that was press fit onto an inner titanium tubing through which the LiBr solution flowed. This assembly allowed the LiBr solution to be heated within the tube itself where components were less likely to be corroded, and the purity of the solution was not compromised. The inlet temperature of the solution, and the pressure drop across the channel were monitored.

Micro-channel test section 108 consisted of a 2.54-cm long 316 stainless steel tube, with 125 μm ID, or a 5.08-cm long microtube of the same cross section. This tube length resulted in very large pressure drop with no added benefit to the desorption process, and hence was replaced by the 2.54 cm tube. The microtube was snugly fit onto an aluminum cylinder that was electrically heated with a Kapton strip heater. Thermal grease was applied between the tube and the heater cylinder. A press fit of the cylinder to the tube was not possible since the tube had to be disconnected and placed in a beaker with DI water after each test to prevent corrosion. After boiling within the channel, the fluid sprayed into a Teflon separation chamber 110, where the water vapor condensed in the natural-convection-cooled refrigerant collection chamber 112 and the high concentration solution drained from the exit. Preheater 106, channel heater and desorber section were encased in calcium silicate blocks 114 to decrease heat losses to the environment. Condensed water and concentrated solution were collected at the exits of the desorber in a concentration cell and condenser 116 for concentration measurements and for mass measurements using analytical balance 118.

C. Instrumentation

Inlet flow rates were determined by two methods: 1) the known volume of fluid displaced by syringe pump 102 and the measured density and temperature using a Coriolis flowmeter 120 (Micromotion, Model CMF025); and 2) direct measurements indicated by the Coriolis flowmeter 120. The Coriolis flowmeter density and temperature measurements also helped determine the inlet concentration of the solution to a high accuracy using Equation 6. Stop valve 122 at a flowmeter entrance (see FIG. 4) allowed for zeroing the meter when necessary. The wetted parts of flowmeter 120 had to be made of Inconel to withstand corrosion by LiBr solution. Exit solution and refrigerant mass were measured using an accurate mass balance 118 (Scientech model SA120). The exit solution concentration was measured offline using a calibrated electrical conductivity meter. Pressure drop across the desorber was measured using a capacitance-type pressure transducer (Validyne Engineering, Model CD-15). Temperatures were measured at the preheater exit and in the separations chamber using calibrated J-type thermocouples. The flowmeter, conductivity meter, pressure transducer, and thermocouple data were collected and processed by a NI SCXI-1000 chassis and a high-precision NI SCXI-1328 module with a cold-junction compensator. This set-up allowed eight voltage inputs from several different types of instruments to be monitored and recorded simultaneously. Table 3 provides more details regarding the instrument specifications and uncertainties.

Syringe pumps 102 were controlled using the computer by serial port commands, and data were recorded and displayed using a LabVIEW® program. Temperature, pressure, concentration and flow measurements were recorded at a rate of 1 Hz to allow for settling time between large voltage changes, and to limit the file size for long-duration tests. Input voltages were converted into useful measurements using predetermined correlations and instrument calibrations.

TABLE 3

Major Instrument Specifications and Measured Uncertainties

| Component | Detail | Range | Uncertainty | Calibration |
|---|---|---|---|---|
| Syringe Pump | Kloehn VersaPump 6 | 0.1-188 ml/min | 0.42% | manufacturer |
| Mass flow Meter | Micro Motion ELITE CMF010N (Coriolis type) | 3-1800 g/min 0-5000 kg/m$^3$ −50-125° C. | 0.1% (~11% for <1 g/min) ±1 kg/m$^3$ ±1° C. | manufacturer |
| Power Supply | Tektronix PS2520G | 0-54 W | ±0.05 W | manufacturer |
| Thermocouple | Omega J Type 1/16 316 SS Ungrounded | 0-440° C.; calibrated range: 0-90° C. | ±0.25° C. | variable temperature bath with NIST traceable thermistor standard |
| Pressure Transducer | Validyne DP 15 | 0-15 psig | 0.04 psig | dead weight tester |
| Mass Balance | Scientech SA120 | 0-120 g | ±0.0001 g | ultra class calibration mass |

Figure 5B:
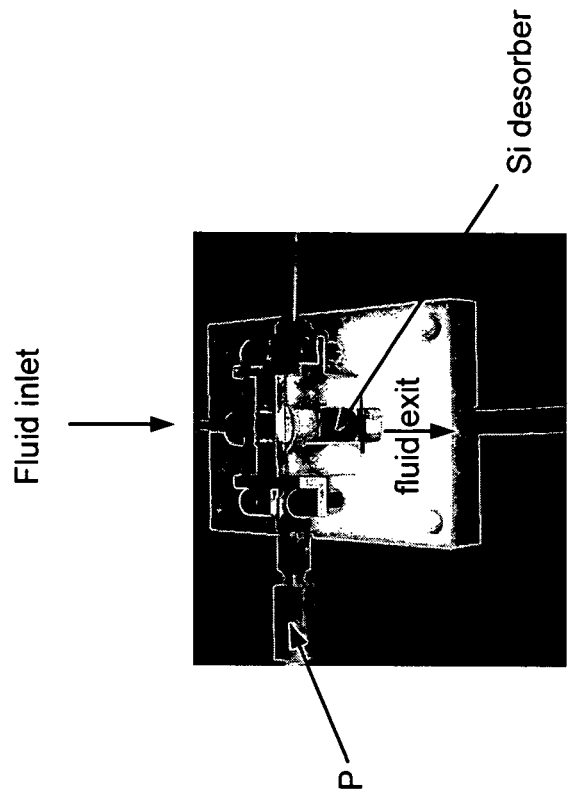
FIG. 5B is a digital image of the embodiment of FIG. 5A.
Figure 5A:
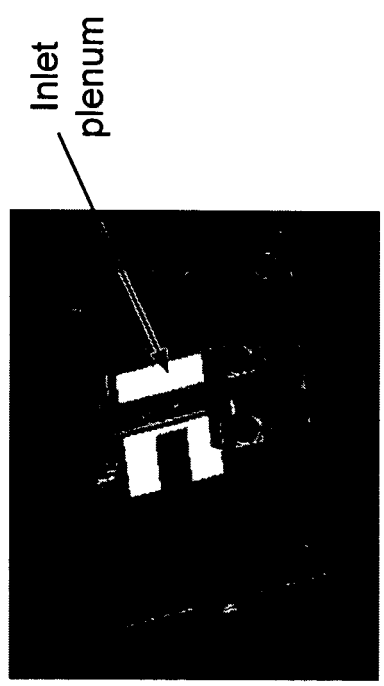
FIG. 5A is a schematic diagram illustrating a silicon microchannel fluidic and interface embodiment.

D. Microchannel Desorber Set-up for Flow Visualization Studies Apparatus and Test Section The test apparatus set-up for these experiments was in most part identical to that in the single channel global measurements (FIG. 4), although different test section and desorber were connected to the preheater. FIG. 5A is a three-dimensional assembly and FIG. 5B is a digital image of the fluidic interconnects to the desorber. The fluidic interconnect assembly consisted of upper and lower sections held together using four screws and an aluminum clamping fixture. The assembly was fabricated using Teflon. The upper section consisted of an inlet plenum with a fluid inlet port, and two additional ports to measure fluid temperature and pressure. The inlet reservoir was surrounded by an elliptical o-ring to provide a tightly sealed, fluidic contact with the desorber inlet section. Two set-screws were located on the aluminum clamping fixture to allow the seal to be tightened. The upper section was designed with a central slot to facilitate the visualization of flow in the desorber, and two smaller holes to one side to facilitate electrical interconnects using pogo-pins to the thin-film heater located below the microchannel desorber. The bottom section of the test section consisted of an open reservoir into which the exit flow from the desorber exited. This reservoir had a drain into a receiver. Four apertures at predetermined locations were used to fix the entire set-up onto a precision x-y micrometer on the base of the microscopic thermal imaging system.

E. Desorber Design and Fabrication

Figure 6B:
FIG. 6B is an infrared image of the 10-channel desorber of FIG. 6A.
Figure 6A:
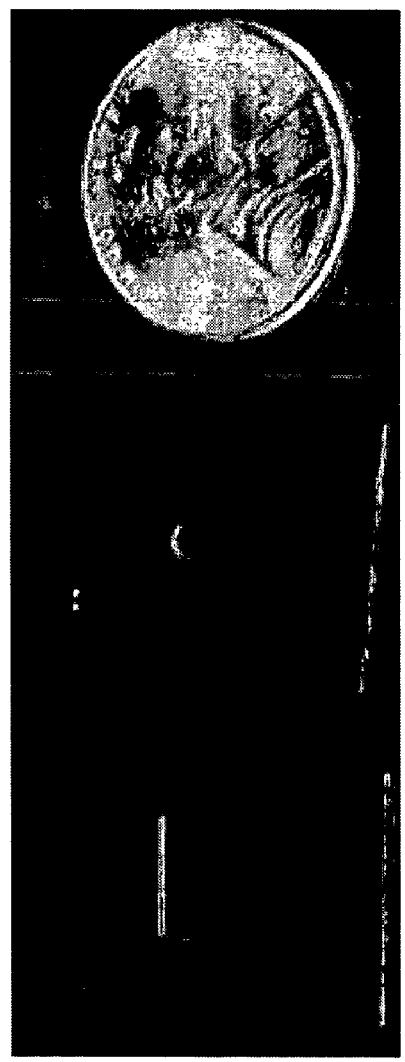
FIG. 6A is a digital image of 10-channel desorber and a single-channel all-silicon microchannel desorber adjacent a penny for size comparison.

In order to observe the flow and possibly fluid temperatures non-intrusively within and at the exit of the desorber channel, an all-silicon microchannel was designed. Single and 10-channel silicon microchannel desorbers of 200 μm square cross section were fabricated using deep reactive ion etching (DRIE). The channels were 12 mm long, with a circular inlet having a 2 mm inlet diameter for the single channel desorber, or a rectangular inlet for the 10-channel desorber. Fabrication of this device proved to be a non-trivial process mainly due to the high temperature diffusion bonding process for Si—Si bonding. Although it is far easier and simpler to anodically bond a glass top to the DRIE channel as is done in most microchannel studies, in this study, an all-silicon device was used to ensure that the results were obtained using all channel walls made from the same material. FIG. 6A is a digital image of a single-channel and a 10-channel all-silicon desorber. The desorber could be heated by either a thick-film heater located below the channel, or by a 200 μm wide, 5-mm long, indium-tin-oxide thin-film heater developed by the electrical engineering department at Oregon State University. FIG. 6B is a thermal image of the entrance section of the 10-channel desorber.

F. Multiple Channel Desorbers

Figure 7:
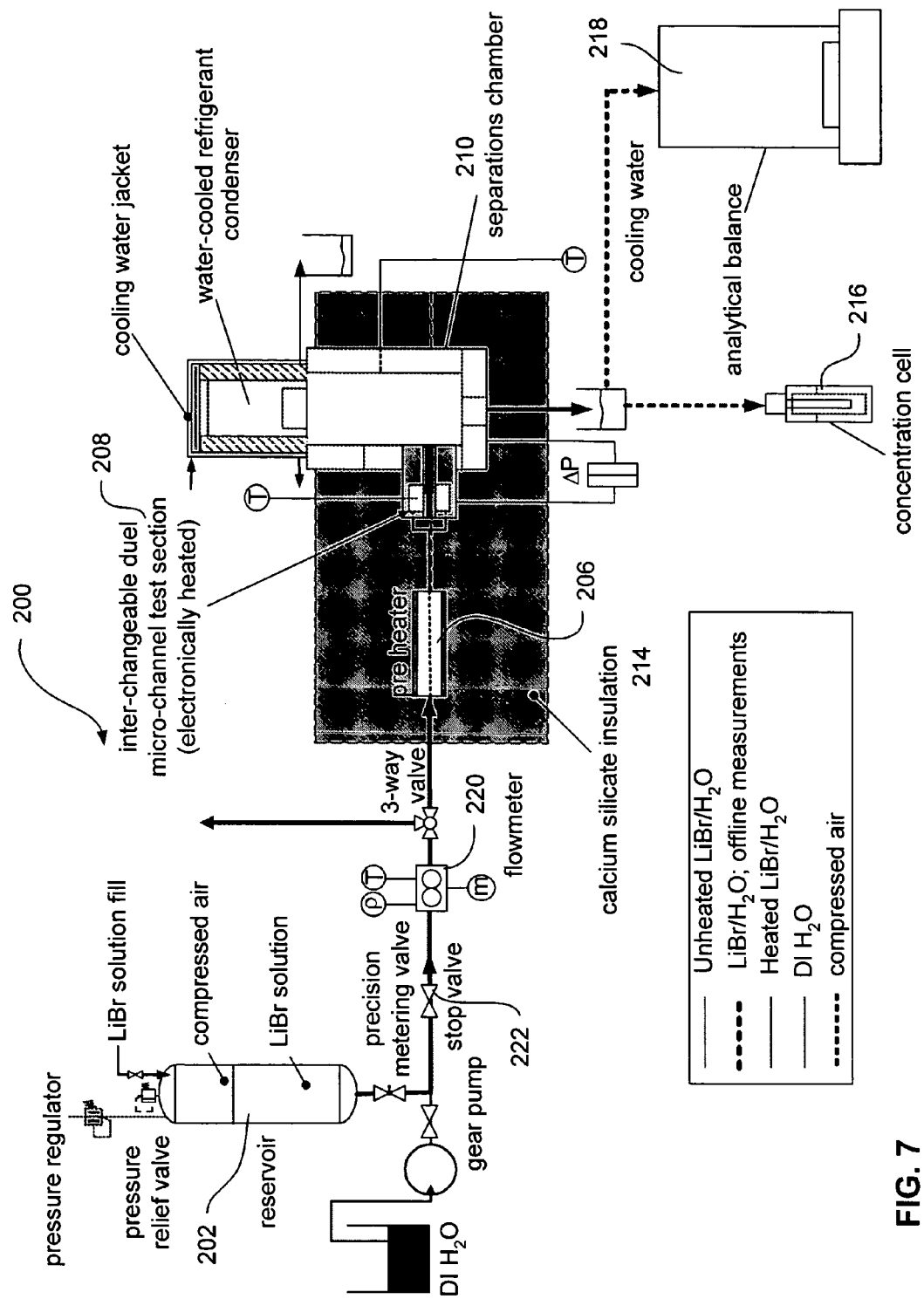
FIG. 7 is a schematic diagram of a test loop used with a 10-channel desorber.

FIG. 7 is a schematic diagram of one embodiment of a test apparatus 200 for the 10-channel desorber embodiment. Much of the fluid set-up designed for the single micro-channel desorber test was applied to the 10-channel desorber as well and similar components are designated with like 200-series reference numerals. Largely, the differences were in fluid supply components and in the desorber test section and fluidic interconnect assembly. First, syringe pumps 102 and reservoir 104 were replaced by a transparent, closed reservoir 202 pressurized with compressed air. Reservoir 202 allowed for continuous flow at a higher flow rate than the previous pump assembly, though the flow rate was not as easily controlled. However, at the higher flow rates used in this test, the flowmeter uncertainties are low enough to document the precise flow rate.

Figure 8B:
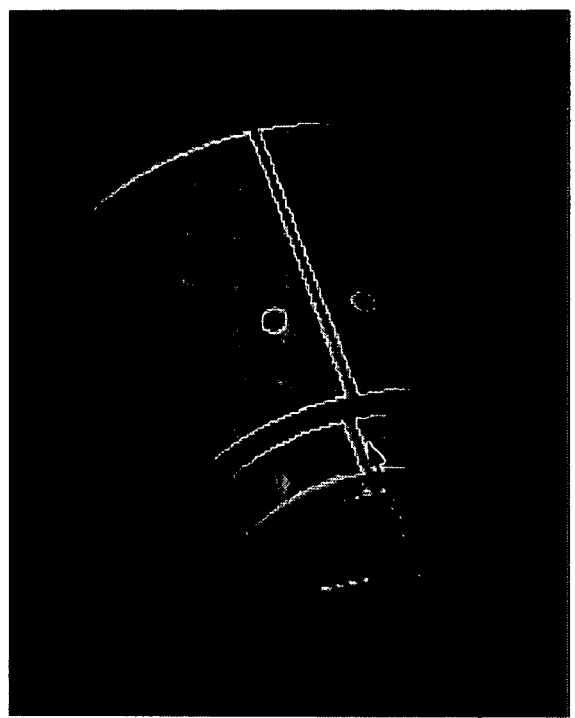
FIGS. 8A and 8B are schematic diagrams of an inlet plenum and fluid interconnects for a 10-channel desorber.
Figure 8A:
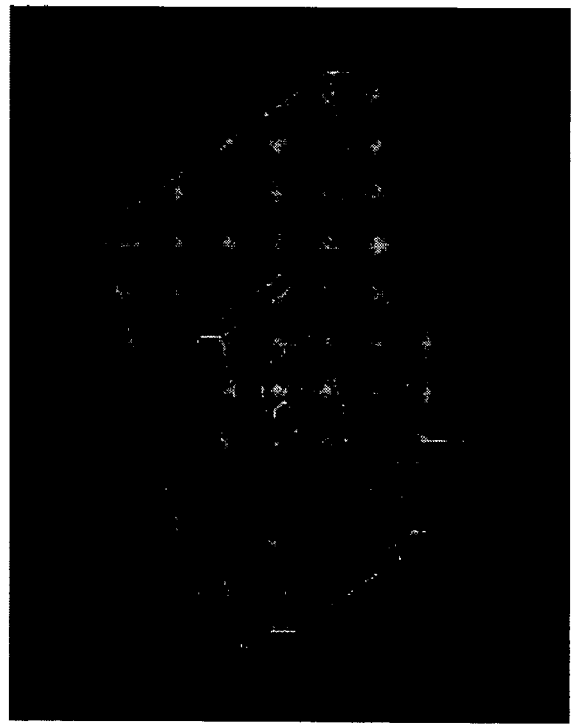

Test section 204 consisted of two titanium desorbers clamped to either side of a Kapton strip heater with copper sheets placed in between. The copper sheets were used to distribute the heat flow evenly across the desorbers. A twin array design was selected to prevent the thick-film heater burn-out problems observed with a single heat sink design. The LiBr solution exited pre-heater 206, then entered two small reservoirs, one located at the inlet of each channel array, as shown in FIG. 8. Within this reservoir, temperature and pressure were recorded with the same instruments described above. The LiBr solution then entered the channel arrays for final heating before being expelled into separation chamber 210. The water vapor gathered in a water-cooled condenser to accommodate the higher vapor flux. The high concentration solution was gathered at the desorber exit. Each liquid was then collected for evaluation and measurement.

G. Desorber Design and Fabrication

Figure 9:
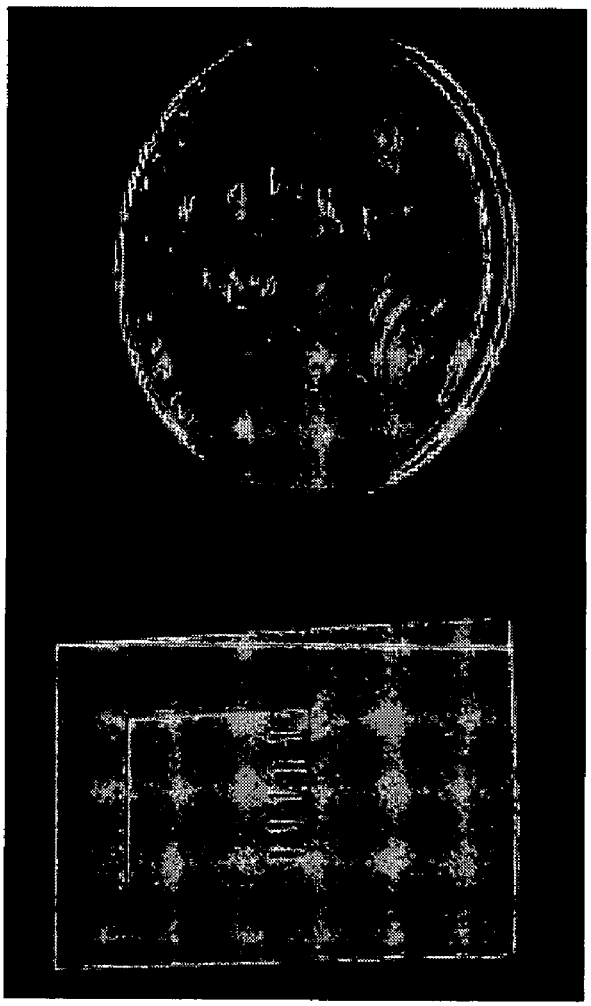
FIG. 9 is a digital image of a 5-channel titanium desorber adjacent a penny for size comparison.
Figure 10:
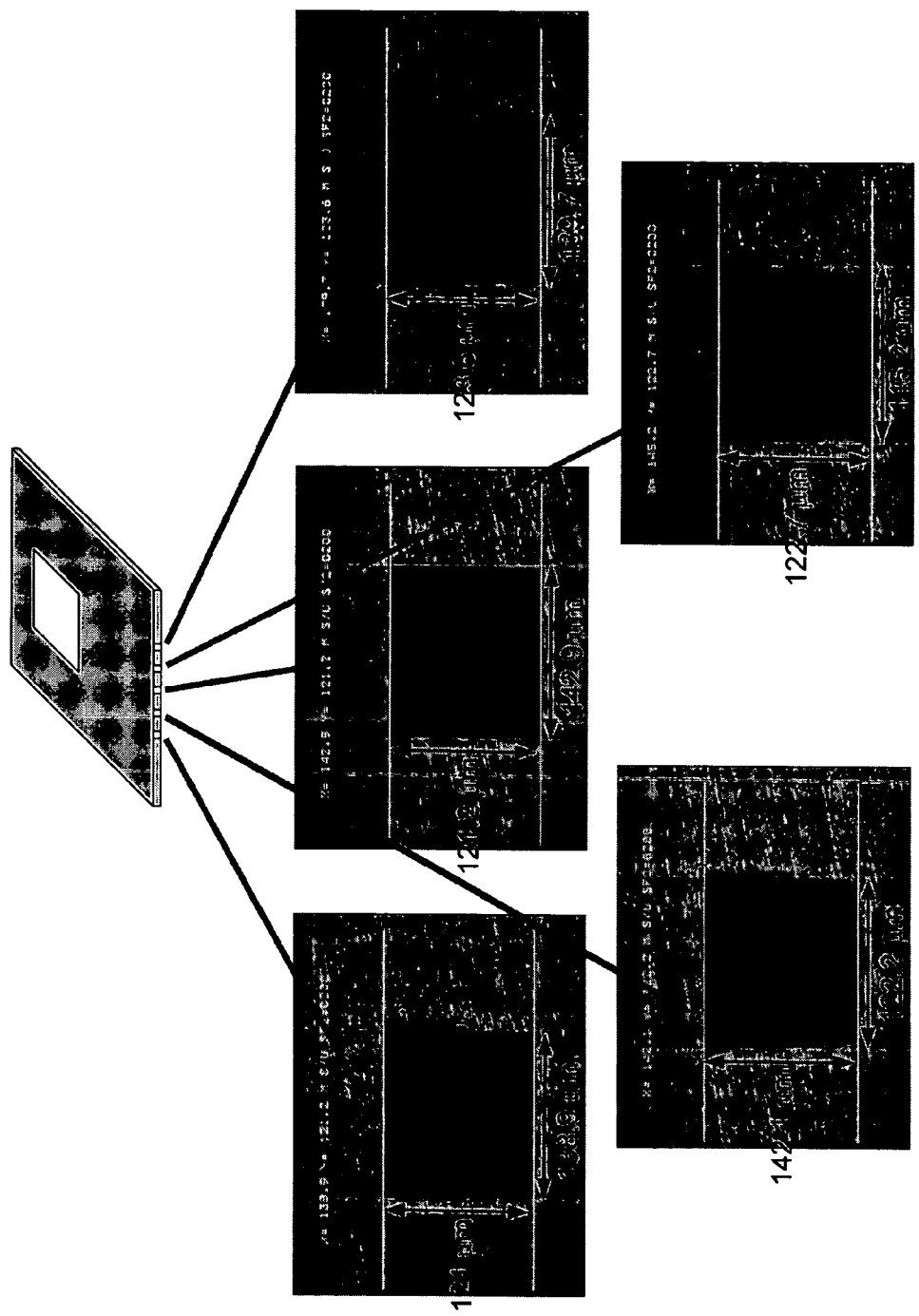
FIG. 10 illustrates dimensions of a working embodiment of the 5-channel, titanium desorber of FIG. 9.

The 10-channel desorber consisted of two titanium arrays of five channels each, with an inter-channel spacing of 0.975 mm. The desorber was 19 mm long×12 mm wide×0.375 mm thick. The channel length was 9 mm. FIG. 9 provides a digital image of the 5-channel desorber, and FIG. 10 represents the dimensions of each channel in this array. As illustrated by FIG. 10, most of the channels were nominally rectangular for this particular working embodiment. The channels extend into a rectangular entrance section, 6.4 mm×7.6 mm in dimensions that interfaces with the Teflon reservoir placed above. The desorber was fabricated at Oregon State University using a laser micromachining process. The titanium laminates were fused together using a diffusion bonding technique.

H. Prototype Multichannel Desorber and Separator

A desorber with a gravity separator was designed to study the performance of desorption for a 150 W cooler. The desorber system can be integrated into a LiBr/H$_2$O test loop during the next phase of the project to study microchannel droplet desorption at the designed sub-atmospheric operating conditions (460 torr absolute pressure) assumed to exist in a man-portable cooler.

Figure 11:
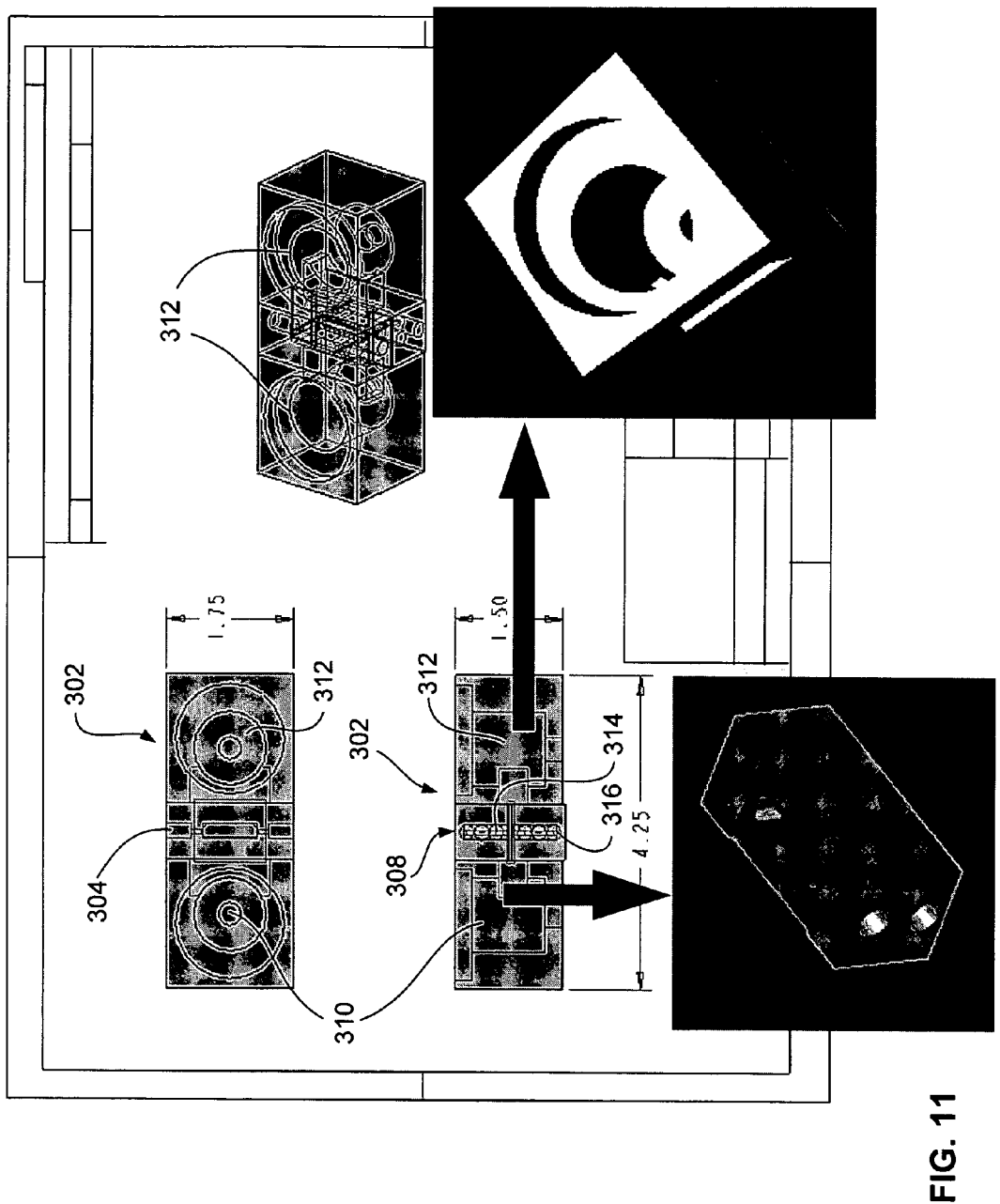
FIG. 11 is a schematic diagram of a 130-channel separation chamber and fluidic interface.
Figure 12:
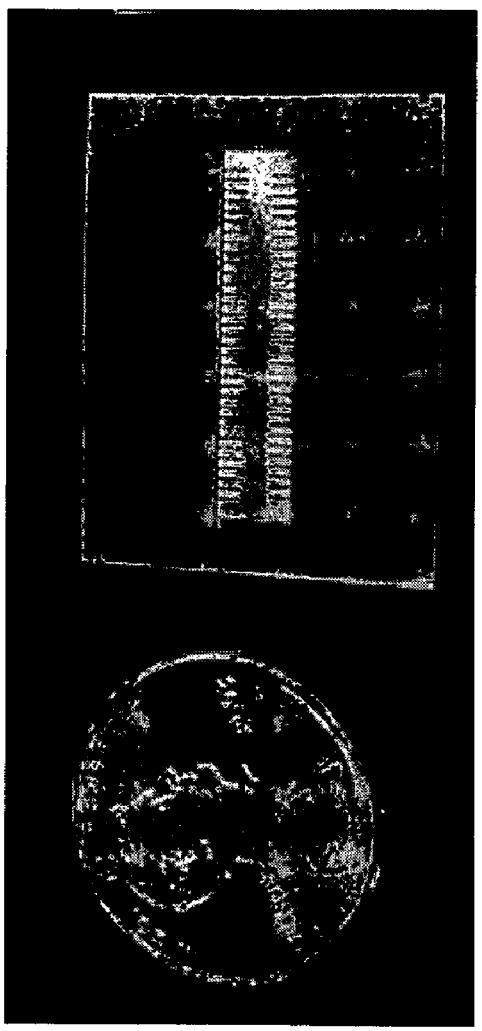
FIG. 12 is a digital image of a 65-channel, titanium desorber adjacent a penny for size comparison.

FIG. 11 is an assembly drawing of a test system 300 and FIG. 12 is a digital image of a 65-channel desorber. Test section 302 was an integrated package; fabricated largely using TEFLON, and consisted of two fluidic interconnect sections 304, 306 prior to the desorber 308, and twin separation chambers 310, 312. Two multichannel desorbers 314, 316, one located on each side of an electrical heater assembly 318 were connected to the two inlet interconnect sections, as shown in FIG. 11. Each fluidic interconnect sections consisted of a plenum, and ports to measure temperature and pressure. A gasket (not shown) ensured that there was no leakage between the desorber 308 and interconnect sections 304, 306. The desorbers 314, 316 could be heated by either thick-film heaters or cartridge heaters located in a copper block in between the desorber.

Initial tests were performed with a 37-channel desorber with all channels cut in one direction, and an inter-channel spacing of ~370 μm. With no heating, jets from adjacent channels merged together to form a single larger jet. Although this effect was reduced with increased fluid temperature, and a continuous jet was not expected to exist during boiling, subsequent working embodiments were designed to provide a larger inter-channel spacing, while still minimizing the overall size of the desorber. With this in mind, two 65-microchannel desorber sections with channels that were 125 μm nominally square in cross-section and 8.5 mm long were fabricated with outer dimensions of 26 mm×21.5 mm×0.375 mm. The channels exited on alternate sides of the desorber to optimally account for a high channel density and an increased inter-channel spacing of 463 μm to help minimize jet interactions at the nozzle exit.

FIG. 12 provides a digital image of a 65-channel desorber embodiment. Fluid enters the desorber 308 through the entrance that sits below the fluidic interconnect section. In order to study the anticipated interference effect in a multi-channel desorber due to jet interactions at the channel exit, a second set of desorbers with 33 channels each, and an inter-channel spacing of 1 mm also were fabricated with the same external dimensions. The process of fabricating these desorbers was identical to the desorbers mentioned in the previous section. The fluid exited the desorbers into twin separations chambers 310, 312 (see FIG. 11) where the concentrated solution was separated by gravity from the refrigerant vapor stream.

III. Microchannel Desorber Examples

Single Microchannel Desorber

The 316 stainless steel microtube was removed from its storage reservoir of deionized water and inserted into the PEEK cross connection. The channel was stored in deionized water as an additional rinsing step to avoid corrosion. After applying a thin coating of thermal grease, the micro-channel heater was slipped over the 316 stainless channel, and the heating assembly was placed into the calcium silicate blocks 114. The 316 stainless steel channel exit was sealed to the desorber separation chamber with RTV silicone gasket maker.

Syringe pumps 102 were started to remove all remaining rinse water from the test set-up. Thereafter, syringe pumps 102 supplied LiBr—H$_2$O solution to the flow meter 120, then back to the reservoir 104 for measuring and defining the concentration. Either DI water or high concentration solution was added to reservoir 104 until the proper concentration was achieved.

Next, syringe pumps 120 were programmed to supply the required flow rate, and the 3-way switching valve 103 was turned to allow flow to the heating assembly. As the solution first became visible in the tubing entering the insulation, preheater 106 was initiated at approximately 8 W, and the micro-channel heater was set to a designated power level.

When the preheat temperature reached 85° C., a valve to the pressure transducer was opened to allow for pressure measurements. At lower temperatures the high fluid viscosity makes pressures above the rating of the pressure transducer necessary to achieve the required flow rate. However, the viscosity is highly temperature dependant and falls to within a manageable range quickly. If the initial pressure reading was still above the 15 psig capacity of the transducer, then the tube was partially plugged by either particulate matter or corrosion and needed to be replaced.

Measurements were begun after the preheat temperature was reached, the wall temperature of the separation chamber 110 arrived at a steady value, and liquid was dripping from the condenser exit. The solution flow from the desorber exit and the water flow from the condenser exit were collected for a period of precisely 20 minutes. During this time, the data acquisition system recorded preheat temperature, desorber wall temperature and preheat pressure. After the 20-minute period, the mass of the concentrated LiBr—H$_2$O and condensed vapor were measured and recorded. When the concentrated solution was within 1° C. of ambient, its conductivity was measured as a third test for vapor production. The conductivity of the salt solution indicates its concentration, allowing for the calculation of vapor through a mass balance, but in this test the conductivity uncertainty was considerably larger than the mass uncertainty. Therefore the conductivity measurement was used only as additional verification of the mass balance results.

Tests were repeated for a single concentration by altering the heating conditions and following the same steps outlined above. After all tests were completed, every component was thoroughly rinsed with alternating deionized water and air until the flow meter reported a density below 997 kg/m$^3$. Finally, the 316 stainless steel channel was returned to its water filled container for additional rinsing.

Single Microchannel Desorber—Analytical Studies

In the analytical studies, deionized water was supplied to an etched silicon micro-channel heated from below. First, syringe pumps 102 were set to provide a constant flow of fluid to the channel entrance, and the pre-heaters and channel heaters were turned on similar to the single channel experiments. Higher heat fluxes were required for this test than other with similar flow rates due to the greater difficulties in providing proper insulation.

Constant adjustment of set-screws that provided a good seal between the Teflon plenum and the silicon desorber was needed during the heating process. A less than adequate tightening of the set-screws caused fluid leakage around the reservoir with increased in temperature due to a mismatch in thermal expansion between Teflon and silicon, while over tightening caused the silicon channels to fracture. Thus the tension which was required to keep the seal intact was checked and modified as necessary every few minutes during the heating process.

When the temperature stabilized at about 70° C., an infrared camera was moved into position above the micro-channel. Higher preheat temperatures were found to be undesirable due to premature initiation of boiling in the outer surface of the silicon. The camera was focused on the exit portion of the micro-channel to facilitate flow visualization and local measurements of the fluid temperature in contact with the channel walls, and temperature profile of the exiting droplets.

EXAMPLE 1

Single Microchannel Desorber

A parametric study was performed by varying inlet concentrations from 47.5 to 57.5 percent by mass, and three microchannel heater electrical power inputs from 3 W to 4.5 W for a fixed mass flow rate of ~0.75 g/min, and a preheat inlet temperature, $T_{preheat}$ ~120° C. The heat energy rate needed for desorption of the fluid in the microchannel, $\dot{Q}_{t,d}$, was estimated using energy balance in Equation 5. In these calculations, the exit concentration, $x_o$ was based on the species mass balance equation, Equation 2, and a measured inlet flow rate, $\dot{m}_{in,s}$, inlet concentration, $x_i$, channel mean pressure, defined as $$P_d = P_{atm} + \frac{\Delta P_\mu}{2} \quad (10)$$

The calculations indicated that the ratio of $\dot{Q}_{t,d}/\dot{Q}_d$ ranged from 49 to 67 percent. The difference can be attributed to the approximations made in the estimation of $\dot{Q}_{t,d}$ and the energy losses to the insulation and separation chamber. A combined heat loss was estimated for the set-up that included the pre-heater and the microchannel heater. Greater than 95 percent of the total energy rate supplied by the heaters could be accounted for using this one-dimensional analysis. Although the heat loss to the surroundings is high, this amount is expected to remain fairly constant for the multiple channel set-up. Thus, with an increase in the number of channels, the $\dot{Q}_{t,d}/\dot{Q}_d$ ratio will be much higher.

Figure 13:
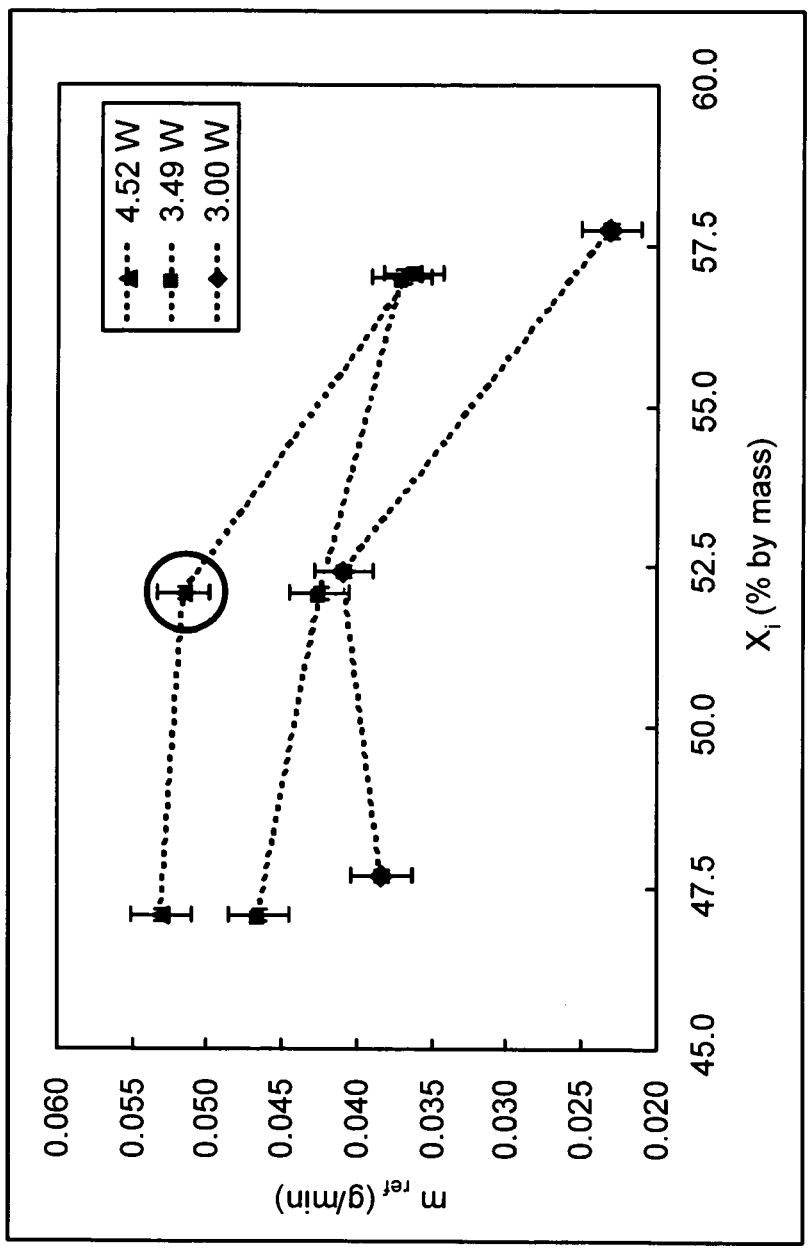
FIG. 13 is a graph of refrigerant vapor flux as a function of inlet lithium bromide/water mixture concentration for a three microchannel desorber at varying electrical input power.
Figure 14:
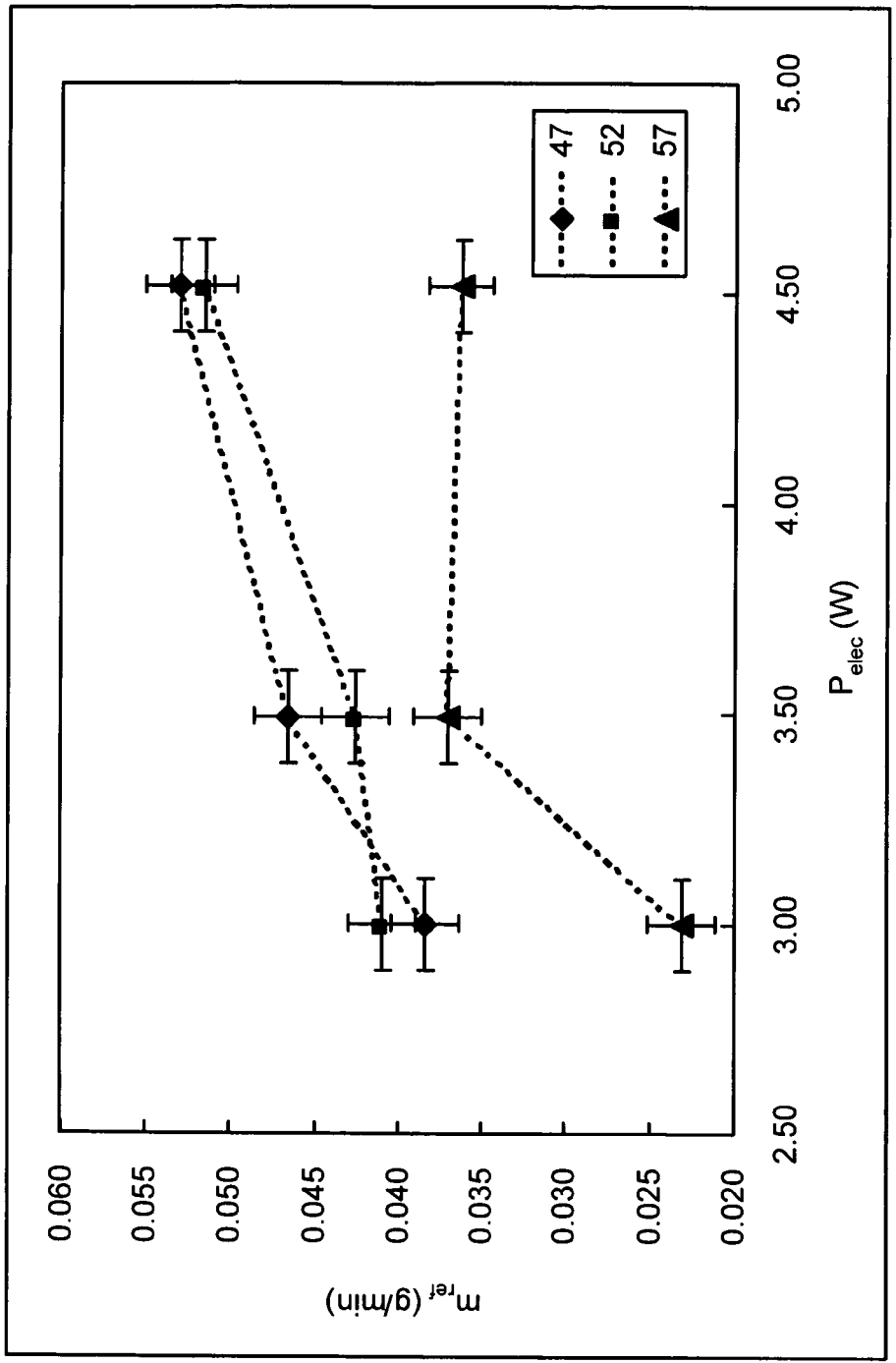
FIG. 14 is a graph of refrigerant flow rate as a function of microchannel electrical input power for a three lithium bromide/water mixture concentrations.
Figure 15:
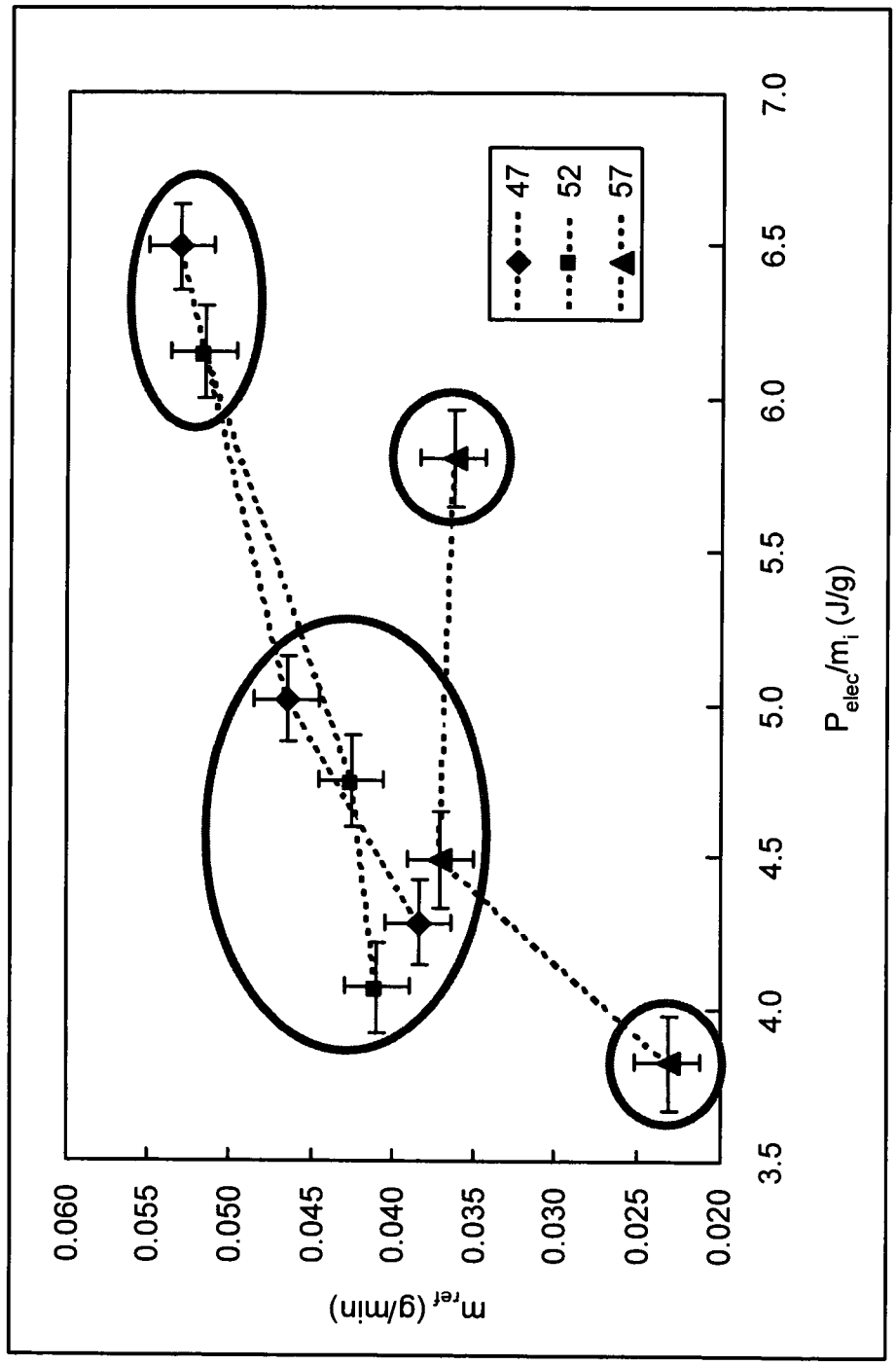
FIG. 15 is a graph of refrigerant flow rate as a function of microchannel input specific energy for three different lithium bromide/water mixture concentrations.

Generally a larger inlet mixture flow rate for the same concentration and heat flux yielded a larger refrigerant flow rate. A fixed inlet flow rate and pre-heater temperature matrix is shown in Table 4. A different vapor collection method was used initially (an inverted reservoir as opposed to an aluminum-fin-natural-convection-cooled collector), a direct comparison between the two data are not possible. FIGS. 13-15 provide the results as cross plots of various parameters. Vapor mass flux was calculated as an average of the measured vapor condensate and solution mass balance (Equation 1).

TABLE 4

Matrix Of Test Conditions For Single Channel Experiments.

| | levels | | |
|---|---|---|---|
| Factors | 1 | 2 | 3 |
| Inlet concentration (% by mass) | 47.5 | 52 | 57.5 |
| Microchannel heater input electrical power (W) | 3.00 | 3.49 | 4.52 |
| Inlet mass flow rate of LiBr solution (g/min) | 0.75 | — | — |

FIG. 13 plots the refrigerant flow rate as a function of inlet solution concentration for three input heat fluxes. For a fixed electrical power input to the microchannel heater, in general, the refrigerant flow rate decreased with increase in inlet solution concentration. For a fixed inlet concentration, an increase in channel power input resulted in an increase in refrigerant flow rate. The pressure drop across the channel was high for the lower concentration of 47.5% compared with the other two concentrations. Overall, with the exception of the lowest heat flux and highest concentration case, all other results indicate a refrigerant flow rate in excess of 0.035 g/minute. The uncertainty bands on the data points are calculated based on single sample uncertainty calculations.

The corrosive nature of LiBr solution warranted an extensive cleaning procedure. Very slight changes in the heat flux input, caused by changes in thermal contact resistance between the heater and the microtube during reassembly, changed the flow regime within the channel, and consequently the refrigerant mass flux. However, very useful estimates of the expected heat flux in multiple channels were obtained, in the absence of interference effects expected in multichannels.

Based on the results of a single channel desorber embodiment, assuming a conservative refrigerant flux of 0.03 gram/minute, a 4-gram/minute refrigerant flux (required for a 150 W cooler) can be obtained using 115 channels. The effects related to multiple channel interactions are not accounted for in this estimate. Based on the results of the single channel, a good compromise between low pressure drop and high refrigerant flux is obtained at an inlet concentration of 52 percent, and a microchannel electrical power input of 4.52 W. The solution inlet concentration is expected to be in the 57.5 percent range. For this concentration, the refrigerant fluxes are generally going to be on the lower end, with a larger pressure drop across the channel than for the 52.5 percent case. If such high inlet concentration is unavoidable in the desorber, a moderate heat flux is recommended.

FIGS. 14 and 15 are cross plots of the same data presented in FIG. 13. FIG. 15 plots the refrigerant mass flux as a function of specific energy supplied to the inlet fluid mixture. Clearly, the two cases circled between about 6.0 and 6.5 J/g are highly desired if refrigerant flow rate is the only consideration. Based on the added constraint of minimum pressure drop across the tube, the 52.5 percent solution should be used. A majority of the other cases can be lumped into a second category, indicated by the largest circle. These cases are a good compromise between power input and refrigerant flux generated. The remaining two cases are not as desirable since they either consume excessive energy for little gain in refrigerant flow rates, or because they provide unreasonably low refrigerant flow rates. Both these cases occur at the highest inlet concentration. These recommendations are restricted to the range of concentrations and heat fluxes shown in Table 4.

For an ammonia/water embodiments of the present disclosure, a mixture of refrigerant (ammonia) and water (referred to as the strong solution) enters an array of microchannels with channel dimensions on the order of 50 to 100 microns. The solution microchannels could alternate with channels containing high temperature combustion products or hot gas from some other processes. An example would be exhaust from an automobile engine. Thermal energy is transferred to the solution, heating the solution and causing the refrigerant to vaporize and form bubbles in the solution microchannels. The large volume change associated with vaporization of the refrigerant forces liquid droplets out of the desorber stack rather like a thermal ink jet printer. This results in a mixture of refrigerant vapor and liquid droplets exiting the desorber stack. Issues related to droplet formation, droplet size distribution and droplet agglomeration should not significantly influence the desorption process because the dimensions of the microchannels fix the diffusion barrier for both heat and mass transfer.

The mixture leaving the microchannel desorber includes refrigerant vapor and droplets. For an ammonia/water embodiment, the mixture leaving the desorber includes ammonia/water droplets and primarily ammonia vapor. At this point the refrigerant vapor must be separated and routed to the condenser, while the other component is collected and allowed to flow to the regenerative heat exchanger. A number of separation techniques may be applicable, including without limitation:

Gravity separations—Gravity forces more strongly influence the dense water droplets than the refrigerant vapor, allowing separation. This approach involves droplets impinging on a surface to encourage droplet agglomeration into a film. However, gravity separation is orientation dependent. This should not prevent the application of gravity separation to stationary or automotive applications, but may prevent the concept from being used for manportable cooling.

Wicking Separation—The use of wicks for separation can result in an orientation independent separations technique. Wicks rely on hydrophilic surfaces in the wick to use surface forces to move fluids. The droplets impinge on a wick, such as a porous metal mesh or foam, and the liquid is wicked away from the desorber to a lower pressure reservoir independent of gravity. Wicking structures for the separation of liquid droplets from a vapor in micro-gravity conditions has been demonstrated.

Electro Hydrodynamics (EHD)—EHD can be used for phase separation and is orientation independent. When applied to a two-phase flow, EDH forces can separate phases. An electric field is applied to the two-phase fluid. The electric field much more strongly influences the liquid phase than the vapor phase, resulting in the liquid phase being attracted to one electrode while the vapor phase is not strongly affected. EHD has been demonstrated for phase separation in evaporating water with dramatic results. EHD requires relatively high voltage but very low current; therefore, it consumes low amounts of electric power. The voltage required for the present applications is not clear but the use of microscale dimensions in the separator will help minimize the required voltage.

Other separation techniques also can be used. For example, and without limitation, such other separation techniques include centrifugal separation and cyclone separation. Moreover, various combinations of all such separation techniques can be used in a single system.

IV. Fractal-Like Branching Microchannel Network Desorber

1. Summary

An ammonia-water desorber/separator that uses a fractal-like branching microchannel network desorber also is described. Assuming desorption occurred in the fractal-like device channels, the expected cooling load and the thermodynamics of the refrigeration cycle were used to predict the flow rate of ammonia-water entering the desorber, refrigerant flow rate exiting the desorber, and the heat added to the desorber. These values were used to size the desorber and separator, which were housed in one unit, the test manifold. A flow loop was designed and built to supply the desorber/separator unit with pressure driven flow. The mass flow rate, temperature, pressure and density of the flow were measured at the entrance and the exit of the test manifold. A global mass balance and species mass balance using these measurements provide the refrigerant mass flow rate and mass fraction. Measurements of the pressure and temperature inside the test manifold, along with visual inspection of the weak solution exiting the manifold, were used to indicate when steady state conditions exist.

Weak solution mass fractions were 21.5 to 39.5% smaller than the strong solution mass fractions, depending on the heat input, demonstrating that desorption occurred in the fractal desorber. Energy input and strong solution mass flow rate were varied to demonstrate the effects on the refrigerant mass flow rate and mass fraction. Energy inputs ranged from 4 to 8 W/cm$^2$, and flow rates between 8 and 20 grams/minute were used, the goal being to maximize refrigerant mass flow rates while maintaining mass fractions above 85%. Refrigerant mass fractions exceeding 90% were obtained, as were refrigerant mass flows of 2.25 grams/minute. A trade off between high refrigerant mass fractions and large refrigerant mass flow rates was shown, defining an optimum operating temperature range. More powerful heaters than were used with working embodiments could be used to operate systems useful for applications requiring higher temperature ranges.

Problems with pressure fluctuations and dry out did not occur.

2. Thermodynamic Desorption Process

In an absorption refrigeration cycle using ammonia/water, a strong ammonia-water solution enters the desorber. Energy is added to the device, thereby producing a weak ammonia solution and a strong ammonia vapor, referred to as the refrigerant. The flow rate of ammonia-water entering the desorber, refrigerant flow rate exiting the desorber, and the heat added to the desorber had to be estimated initially. These unknowns initially were predicted by modeling the thermodynamics of the flow leaving the device if desorption occurs outside the fractal-like desorber. If desorption occurs in the fractal-like device channels, the expected refrigeration load and the thermodynamics of the refrigeration cycle could be used to predict these inputs.

If desorption is to occur outside a fractal-like desorber, the fluid exiting the fractal should have the smallest diameter possible; minimizing the size reduces mass transfer resistance during phase change. Testing a fractal desorber using deionized water as the working fluid and no energy input indicated that the smallest stream dimensions occurred when fluid exited the device as jets. Further testing was performed on fractal embodiments, again using water, but this time heat was applied. Under these conditions, phase change occurred within the channels, not outside the desorber. Desorption in the channels also was seen in a single, straight microchannel device where ammonia-water was the working fluid and there was an energy input. These results indicate desorption occurs within the channels. Therefore, the required cooling load and refrigeration cycle were used to determine flow rates of ammonia entering the desorber, flow of refrigerant exiting the desorber, and required energy input rather than the flow dynamics.

Figure 16:
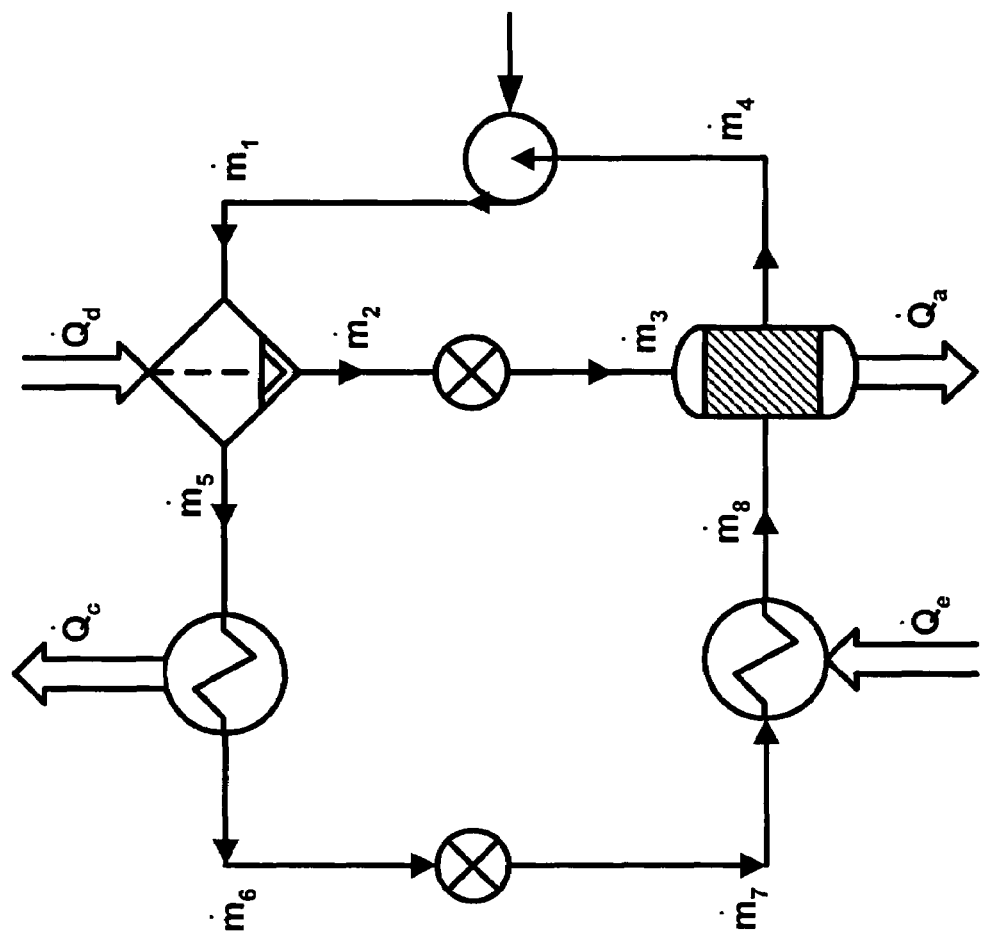
FIG. 16 is a schematic drawing illustrating a thermodynamic refrigeration cycle.

An absorption refrigeration cycle shown in FIG. 16 was used to find the required flow rates and energy input. An idealized model was used, losses between components were neglected and each component assumed to operate at equilibrium conditions. Table 5 provides values in working embodiments to provide an evaporator cooling load, $Q_e$. Using this cooling load, the mass flow rate of pure ammonia exiting the evaporator can be calculated. The mass flow rate of pure ammonia entering the evaporator equals that of the flow exiting, $m_7$, and is therefore known. A species balance:

$$\dot{m}_5 = \dot{m}_7/x_5 \quad (1)$$

provides the flow rate of refrigerant leaving the desorber.

TABLE 5

| | Man Portable Application | Automotive Application | |
|---|---|---|---|
| Cooling Load ($\dot{Q}_e$) | 150 W | 1,000 W | 5,000 W |
| Mass Flow of Liquid In ($\dot{m}_2$) | 115 grams/minute | 768 grams/minute | 3,840 grams/minute |
| Mass Flow of Vapor ($\dot{m}_5$) | 7.2 grams/minute | 48 grams/minute | 240 grams/minute |
| Desorber Heating Required ($\dot{Q}_d$) | 240 W | 1,592 W | 7,960 W |

Assuming the refrigerant and weak ammonia solution temperature and pressure are at the desorber operating conditions, the global mass balance and the associated species masses balances for the desorber can be used to determine the mass flow rate of ammonia-water entering the desorber:

$$\dot{m}_1 = \dot{m}_2 + \dot{m}_5 \quad (2)$$

$$x_1 \dot{m}_1 = x_2 \dot{m}_2 + x_5 \dot{m}_5 \quad (3)$$

$$(1-x_1)\dot{m}_1 = (1-x_2)\dot{m}_2 + (1-x_5)\dot{m}_5 \quad (4)$$

An energy balance provides the required heat input for this situation:

$$\dot{Q}_d = h_2 \dot{m}_2 + h_5 \dot{m}_5 - h_1 \dot{m}_1 \quad (5)$$

3. Fractal-Like Branching Channel Network Desorber Embodiments

Many of the transport systems found in nature have a fractal-like branching pattern. Who better to copy than Mother Nature herself? Studies have shown that heat sinks, which mimic biological systems like those found in our circulatory system, have excellent heat transfer capabilities and low pressure drops.

In a fractal-like branching system a variety of scales coexist, the smaller scale components maintaining a structure similar to that of the larger scale parts. In this case the components are rectangular channels. A single channel branches, e.g., bifurcates, into smaller scale channels, these smaller channels branch into even smaller channels and so on. At each branching, e.g., bifurcation, level the total number of channels increases while the diameter decreases, but the total cross-sectional area increases.

A brief explanation of the theory applied to designing a fractal-like structure is provided here. The following scaling laws were used to create the fractal embodiment shown in FIG. 17:

$$\beta = \frac{d_{k+1}}{d_k} = n^{-1/3} \quad (6)$$

$$\gamma = \frac{L_{k+1}}{L_k} = n^{-1/2} \quad (7)$$

The ratio of the downstream-to-upstream channel diameter, $\beta$, relates the hydraulic diameter of one branching level to the diameter of the branch preceding it. The branch closest to the flow origin is represented by k=0, the next branching level, k+1, is k=1, and so on. The number of channels an upstream channel branches into, n, is 2 in this case because a bifurcating system is being used. However, the value of n can be varied, such as, for example, with a trifurcating system, where n=3. The length of a channel segment is represented by L, and the ratio of the downstream-to-upstream channel length is given by $\gamma$.

The scaling laws described above were used to design fractal-like desorber embodiments, but manufacturing limitations influenced the choice of channel diameters. The fractal pattern was laser machined into a 1.5-inch-diameter stainless steel disk. The laser machining progress dictated a maximum channel depth of 250 μm. Possible channel blockage and dry out during boiling were two possibilities also taken into consideration when the terminal channel width was chosen. Stainless steel may seem like an unusual material to use when thermal conductivity is so important. However, a working fluid of ammonia hydroxide and machining limitations dictated this choice. Material selection therefore is, at least to some degree, application dependent. As a result, materials other than stainless steel, including metals and alloys, such as glassy metals, titanium, copper, and brass, intermetallics, and polymeric materials, such as TEFLON®, also can be used.

While initial studies were performed on the fractal-like desorber described above, a new fractal-like pattern was designed and built. The next generation fractal-like desorber has increased channel density, higher flow rate capability per pressure drop, and enhanced heat flux capability. Machining limitations encountered with the original design were circumvented by using a chemical etching process.

4. Separator

A test manifold was designed to hold the fractal-like desorber, the heaters required for desorption and to separate the refrigerant from the weak solution. The material selected had to be able to withstand elevated temperatures and concentrated ammonia liquid and vapor. PTFE (Teflon®) meets these specifications. It has a high melting temperature, is not affected by prolonged exposure to ammonia, is easy to machine and is thermally insulative, making it a suitable choice for the manifold material. Polypropylene is compatible with ammonia, but has a much lower melting temperature than Teflon®. For this reason it was not used in the manifold, but was employed for lower temperature applications such as flow loop plumbing. Working with volatile, corrosive fluids at an elevated pressure makes effective sealing an important design consideration. Silicone o-rings work well in high temperature environments and are unaffected by exposure to ammonia, and were therefore used to seal this assembly. Ammonia is especially corrosive to metals, and stainless steel is one of the few that will not be corroded. Stainless 314 and 316 were used in instrumentation and valves. The original fractal-like desorber was constructed from Stainless 316; Stainless 304 was used for the next generation.

Figure 18:
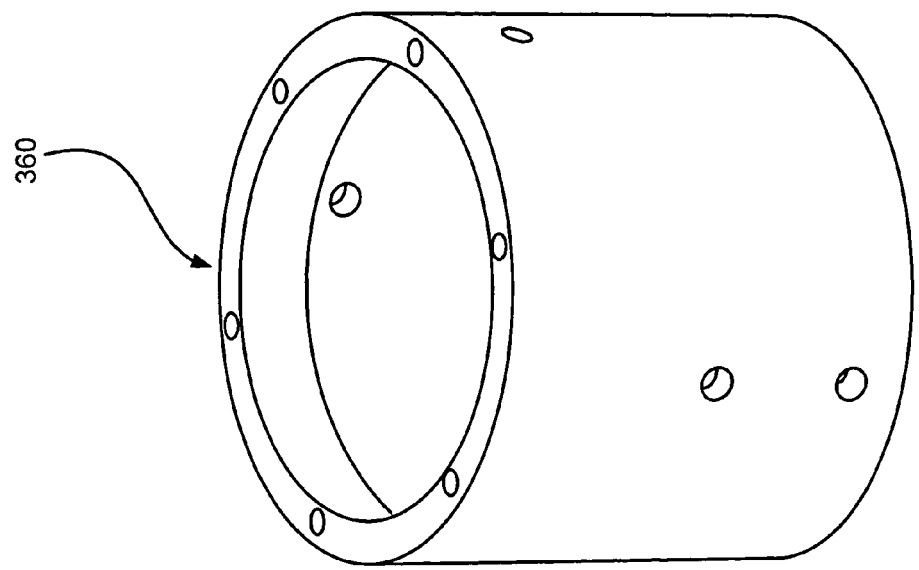
FIG. 18 is a schematic drawing illustrating embodiments of manifolds for use with the described systems.
Figure 18:
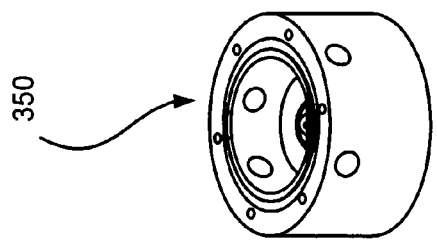

Once the material constraints were fully understood, manifold embodiments were designed. An understanding of how the fluid exits the fractal-like desorber was not initially available. Jets of liquid were expected and it was assumed that desorption due to mass transfer would occur outside the device upon jet break up. A test manifold with a large, visible plenum was designed to facilitate this process. However, evidence of both liquid and vapor leaving the fractal was found, which meant a large plenum was not necessary. Not only was a large test manifold unnecessary, it may be problematic for certain embodiments. Obtaining and maintaining steady state and thermodynamic equilibrium is complicated by larger plenum volumes. Working embodiments of a small manifold 350 and a large manifold 360 for size comparison are shown in FIG. 18.

The separator used for certain disclosed embodiments was orientation dependent, relying on gravity to remove the liquid from the vapor. Hydrophobic Teflon® porous plugs with a pore size of 30 μm were inserted into all vapor exits. The purpose of these plugs was to facilitate gravity-dependent separation. Any liquid trying to escape through the vapor ports would be held in the plenum. And, because of the location of the ports/plugs, such liquid would be forced by gravity to exit the liquid ports. It was later seen that the plugs were not necessary.

Figure 19:
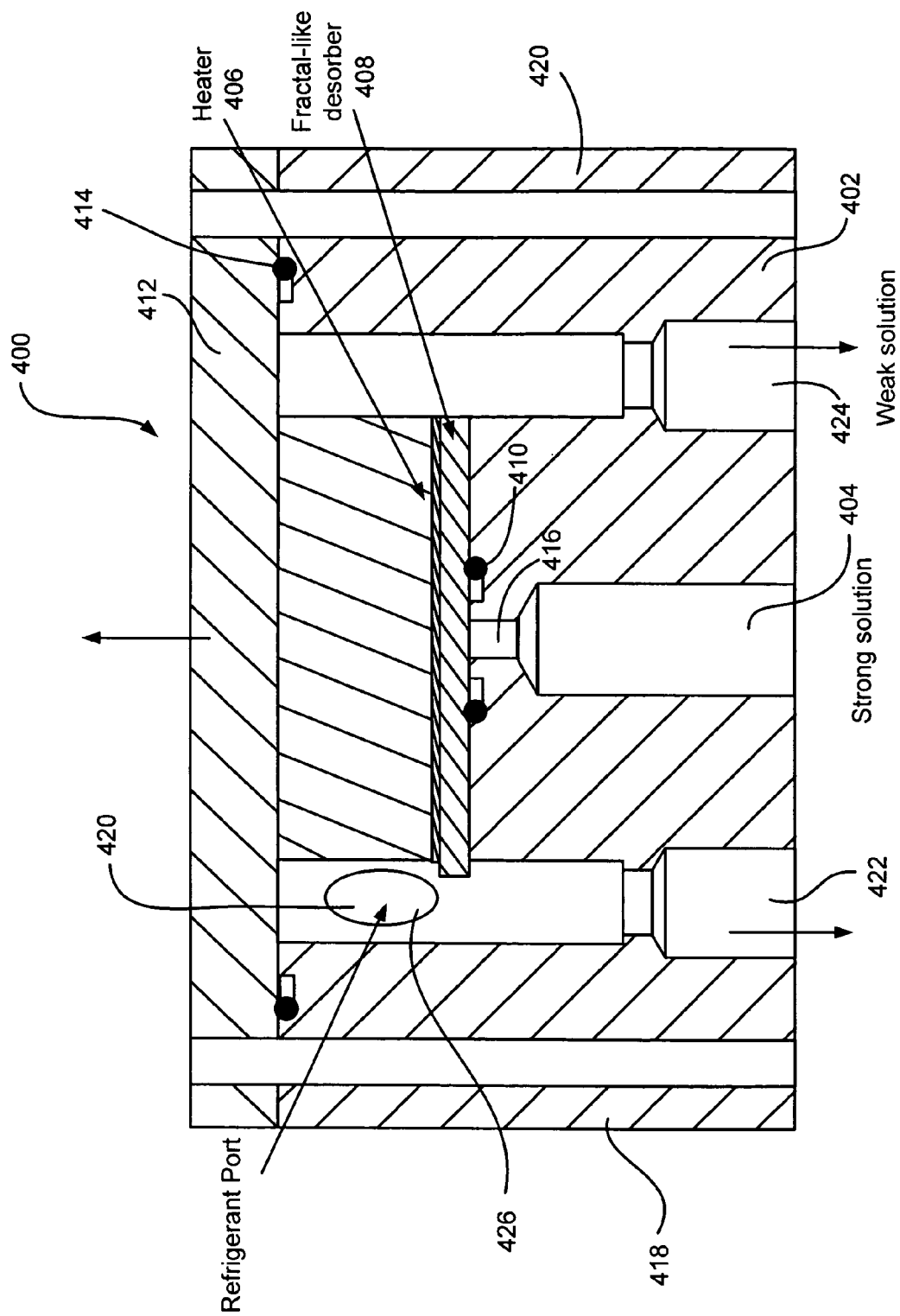
FIG. 19 is a schematic cross sectional drawing illustrating one embodiment of a manifold assembly.

The physical design of one embodiment of a modified manifold assembly was keyed off the desorber and heater as is illustrated by device 400 of FIG. 19. Manifold bottom 402 was a solid piece of three-inch-diameter, PTFE stock with various features machined therein. A strong solution inlet 404 is located at the center of the manifold bottom 402 and is drilled through a center column. Heater 406 is positioned fractal desorber embodiment 408 in the illustrated device 400. A spacer is used to transmit the clamping force required to keep the heater 406 tight against the fractal embodiment 408 and the fractal compressing o-ring 410 used to insure all the strong solution enters the fractal. Six bolts (not shown) hold manifold top 412 and bottom 402 together and supply the necessary clamping force to compress O-ring 414 to keep device 400 sealed. Space between the fractal center column assembly 416 and outside walls 418, 420 provides the separation plenum. Two weak solution exit ports 422, 424 are located at the bottom of the manifold and refrigerant vapor ports 426 are located in the manifold walls near the top of the device 400.

In a first embodiment of the manifold, a stainless steel unit containing cartridge heaters was used to provide energy to the fractal. Problems associated with this method included sealing, size, and control. In the modified manifold, thin film heaters coated with silicone were used. The heater diameter used was very close to that of the fractal, therefore applying the same heat flux over the entire surface. These heaters have low heat flux capabilities, approximately 10 W/cm$^2$ maximum.

Figure 20:
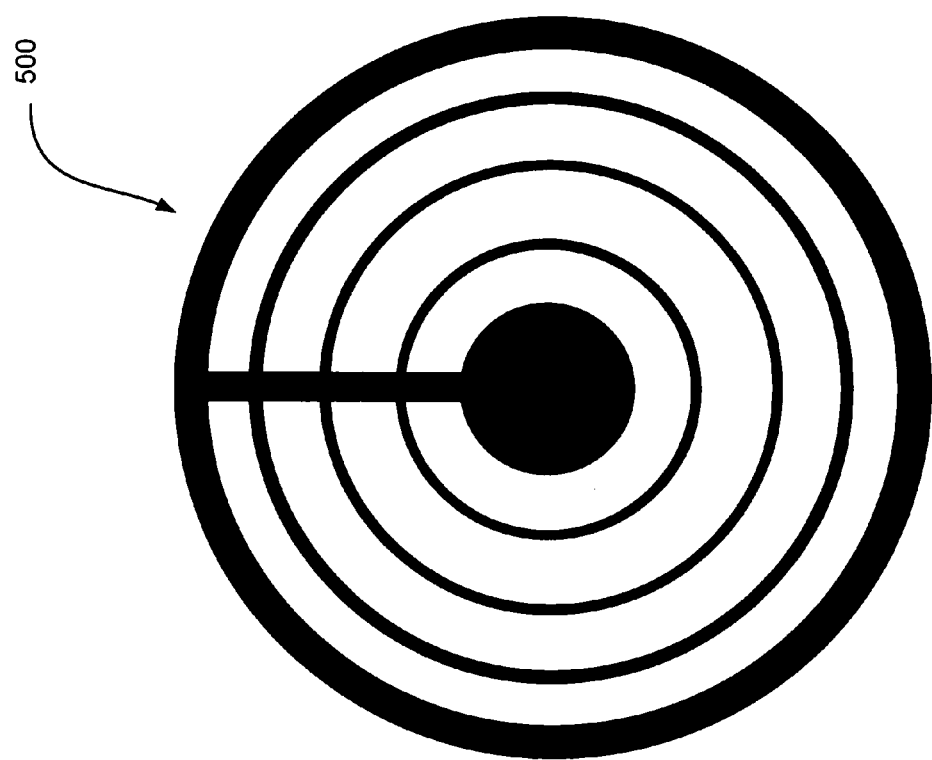
FIG. 20 is a schematic drawing illustrating one embodiment of a custom thin film nichrome ring pattern heater.

A custom made thin film heater was designed to overcome these limitations. FIG. 20 illustrates one embodiment of a thin film heater 500. By vapor depositing nichrome onto a silicone wafer substrate in a ring-like pattern, heat fluxes of up to 100 W/cm$^2$ can be achieved. Unlike the off-the-shelf heaters, the silicon substrate heater is not coated in silicon and requires a seal to prevent contact with ammonia.

5. Fabrication

Figure 17:
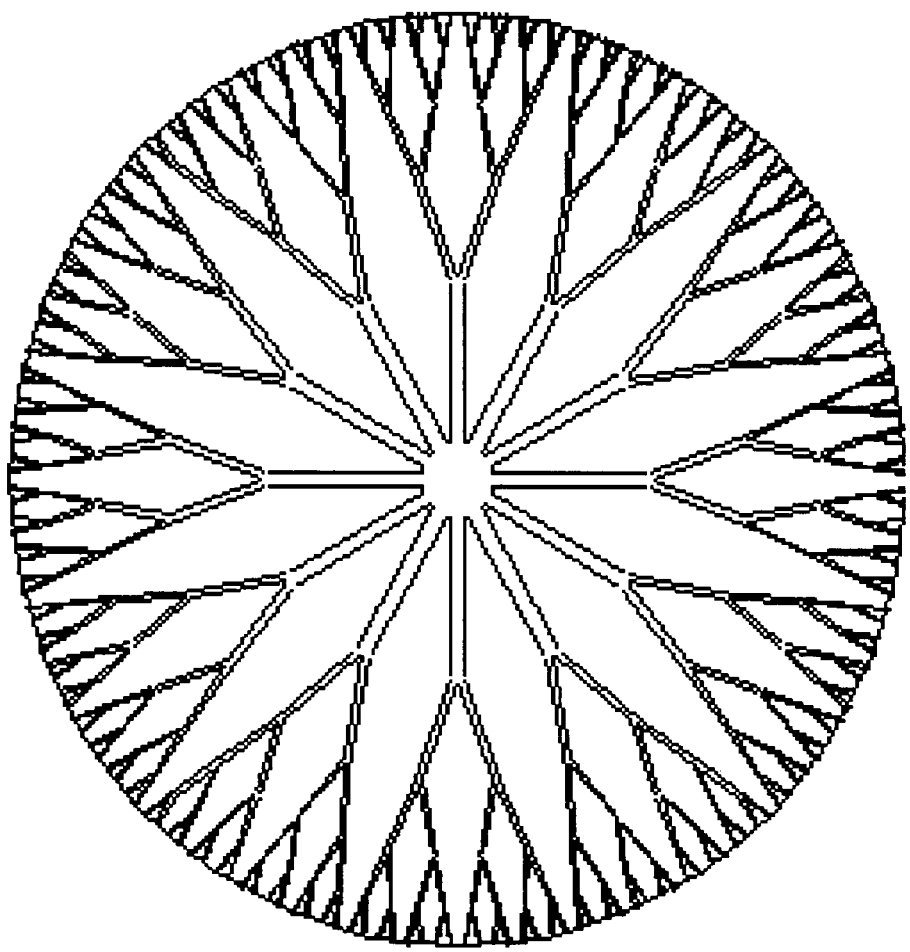
FIG. 17 illustrates one embodiment of a fractal-like branching channel flow network.

One embodiment of a fractal-like pattern was laser micro-machined through a 1.5-inch-diameter, stainless steel disc. Through cutting the given pattern can result in numerous free floating pieces. A bridge structure was added to the outer circumference of the disk and at the center to hold all potential free floating parts in place, as is shown in FIG. 17. Once the pattern was cut, solid pieces were diffusion bonded to the top and bottom of the patterned piece. Vaporized metal ejected during the laser cutting process had to be removed from the patterned piece to ensure a good bond. Bridge structures were removed after bonding, resulting in a 1.4-inch diameter disk.

Forming microchannels is not a simple task and several alternatives were investigated before laser micro-machining was selected for making working embodiments. Chemically etching the channels into the stainless steel disk was investigated. The channel could be etched to a set depth in two separate disks, which when bonded would provide the desired channel height. Free-floating parts and the need for a bridge structure would be eliminated, but the obtainable aspect ratio is limited and proper alignment is difficult. Etching the channels in a silicon disk using deep reactive ion etching (DRIE) also was evaluated. This process allows three walls of a very-high-aspect-ratio, rectangular channel to be formed. A Pyrex glass top must be anodically bonded to the silicon substrate, providing the fourth channel wall. This option was not used due to the fragility of silicon and the expense.

Diffusion bonding is not without its problems. High-aspect-ratio channels that are diffusion bonded might experience top and bottom wall sag. Braze bonding is an alternative to the diffusion bonding process and addresses the channel wall sag issue. This process requires that thin lamination layers of a low-melting-temperature braze metal be laid down and then the temperature of the unit raised above the metal's melting point to form a solid. Reasonable care must be taken to substantially preclude brazed metal from seeping into channels.

6. Test Facility
A. Flow Loop

Figure 21:
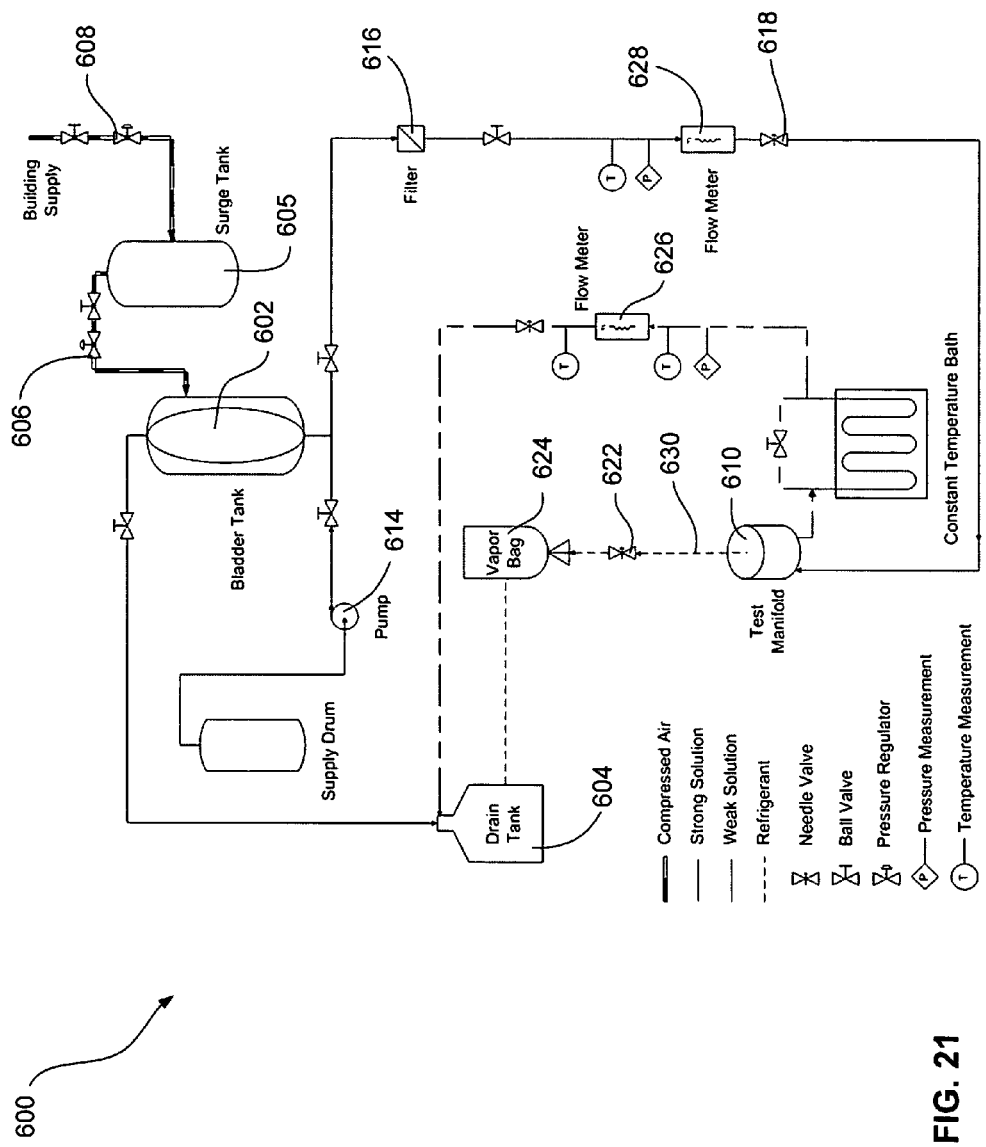
FIG. 21 is a schematic drawing illustrating a working embodiment of a flow loop.

Experimentation and data acquisition related to desorption and separation of ammonia hydroxide in a fractal-like desorber device was conducted using a flow loop 600 (FIG. 21) designed and located at Oregon State University. Fluid flow in the loop 600 travels from a pressurized bladder tank 602 to a drain tank 604 at atmospheric pressure. The flow loop 600 can be described in terms of the four different fluids present: compressed air, strong solution, weak solution, and refrigerant vapor. The strong solution used for this project was 0.30 ammonia.

Compressed air drives fluid flow through the loop. The air exerts force on a flexible bladder in bladder tank 602 containing strong solution. A surge tank 605 with pressure regulators 606, 608 on either side damped oscillations in the building air supply.

A strong solution line was located upstream of the test manifold 610 and was at room temperature. It includes a supply drum 612 plumbed to the bladder tank 602 in line with pump 614. A gear pump (not shown) was used to fill the bladder tank. Strong solution passes from the bladder tank 602, through a filter 616, the instrumentation, a needle valve 618, and then enters the manifold 610.

Heat was added to the strong solution entering test manifold 610, and a weak solution and refrigerant result. The weak solution exits through ports in the bottom of the manifold 610. It passes through a constant temperature bath 620 to cool it, a needle valve, and then through various instruments used to record its properties before emptying into the drain tank 604. Refrigerant passes through the top of the manifold 610, and needle valve 622 and then is captured in a vapor-receiving bag 624.

Bladder tank pressure is preset on a pressure regulator and a constant upstream pressure is maintained. Needle valves control the flow in each of the three fluid lines: strong, weak, and refrigerant. The overall system flow can be regulated with those three valves. A fourth variable present in the flow loop is the heater power, controlled by the variac power supply. These controls are used to achieve a pseudo steady state within test manifold 610. Keeping the level of weak solution in the test manifold 610 the same during data acquisition is achieved by visually monitoring the flow leaving the test manifold through the transparent weak solution line. Steady state conditions can be maintained when the temperature and pressure are constant and this liquid level is unchanging.

B. Instrumentation

A design stage uncertainty analysis was performed to insure that the proper instrumentation was chosen. Each instrument error, $u_d$, was determined using the root sum square (RSS) method and then the total instrumentation error found using the RSS method.

$$u_d = \sqrt{u_o^2 + u_m^2} \qquad (8)$$

With reference to this formula, $u_o$ represents the instrument zero-order uncertainty, which typically is one half the instrument resolution, and $u_m$ is the manufacturer reported uncertainty.

In order to gather data in an efficient, accurate way, an automated data acquisition system was assembled. Pressure, temperature, mass flow rate and density were measured and used to determine the refrigerant mass flow rate and the mass fractions of the inlet, exit and refrigerant flows. A program written in Labview controlled the data being delivered from a data acquisition board and a GPIB board. The voltage and resistance of the heaters also were measured and used to determine the power supplied to the heaters. A gas chromatograph unit was used to validate mass fraction results. The following describes the instruments used to make the various measurements.

In flow loop 600, pressure was measured with thin film, millivolt output pressure transducers purchased from Omega. Three pressure measurements are made: strong solution before the needle valve; weak solution before the needle valve; and in the test manifold. The upstream pressure transducer has a range of 0-200 psia and a reported uncertainty of ±1 psia. This large range is required because the strong solution is at the high pressure required to drive the flow. The downstream and manifold pressure transducers have a range of 0-30 psia and an uncertainty of ±0.16 psia.

Thermocouples and resistance temperature devices (RTD) were used to evaluate fluid temperatures at certain points in the flow loop. The strong solution temperature is measured before the needle valve with an RTD. An RTD also provides the weak solution temperature before the needle valve on that side of the loop. The Omega RTDs used were four wire, 100 Ω platinum devices capable of measuring up to 600° C. with an uncertainty of ±0.1° C. Omega-Type thermocouples provide the fractal surface temperature and plenum temperature with an accuracy of ±1° C.

The global mass balance and species mass balance were used to calculate the refrigerant mass flow rate and mass fraction. Accurate mass flow rate measurements are required to lower the uncertainty in these calculations. For this reason, coriolis-type mass flow meters 626, 628 from Micro Motion were selected. The meters output a 0 to 10 V square wave, with a frequency corresponding to the flow rate. An uncertainty of ±±0.05 grams/minute can be expected given the operating conditions of this study. The Micro Motion mass flow meters measure the fluid density simultaneously with mass flow rate. Densities ranging from 0 to 5,000 kg/m$^3$ can be measured with an uncertainty of 0.5 kg/m$^3$.

A Tektronix digital multimeter (DMM) was used to measure the resistance of the electric heaters. The voltage supplied to these heaters also was measured using a Tektronix DMM. The DMM voltage and resistance uncertainties are 0.5 V and 1 Ω, respectively.

Measurements from the pressure transducers and mass flow meters were received by a National Instruments data acquisition system (DAQ). The 16-bit resolution DAQ board samples the pressure transducer and density analog signals at 1,000 Hz for 30 second periods. The frequency output related to mass flow rate is sampled in 0.5 second blocks for 30 seconds.

The temperature data was recorded using a Keithley Multimeter controlled by a National Instruments GPIB board. All RTDs and thermocouples were wired to the Keithley, which reads voltages corresponding to temperature. The Keithley correlates the voltages to temperatures and sends the data through the GPIB board and data acquisition program. The Keithley takes one measurement per data point.

Gas chromatography (GC) was used to validate the results of the ammonia-water vapor mass fraction determined by the species mass fraction. For this application, the GC column was a 0.125-inch diameter, 6-feet long tube packed with mesh.

A sample was injected into the gas chromatograph (GC) unit, where a carrier gas (helium, in this case) carries the sample through the column. With the right combination of parameters, such as column temperature, carrier gas flow rate, and sample size, the ammonia-water solution is completely separated. In this application, the sample flows over a thermal conductivity detector (TCD). The output of the GC unit (HP 5890A) is a signal from the TCD corresponding to the difference in thermal conductivity between the carrier gas and sample. This signal was plotted, and usually was in the form of peaks on a baseline. The area under these peaks was recorded and integrated with a separate integrator (HP 3395), and the percentage of total area was the indication of species weight percentage.

C. Testing and Evaluation

Feasibility of disclosed embodiments of fractal-like desorbers were demonstrated using a 1.4-inch-diameter, 800-μm-thick, stainless steel, fractal device housed in the modified manifold. A parametric study followed, where the energy input and strong solution mass flow rate were varied to demonstrate the effects on the refrigerant mass flow rate and mass fraction using the same fractal-like device.

Refrigerant mass flow rate is determined from the global mass balance, Equation (2), while refrigerant mass fraction is found using the species mass balance, Equation (3). A propagation of error analysis of the refrigerant mass fraction calculation results in:

$$u_{5x} = \sqrt{A^2 + B^2 + C^2 + D^2 + E^2} \quad (9)$$

With reference to this formula, $u_{5x}$ is the refrigerant mass fraction uncertainty and A, B, C, D, and E are defined below.

$$A = \left(\frac{x_1}{\dot{m}_5}\right) u_{1\dot{m}} \quad (10)$$

The strong solution mass flow rate uncertainty, $u_{1m}$, is ±0.07 grams/minute.

$$B\left(\frac{\dot{m}_1}{\dot{m}_5}\right) u_{1x} \quad (11)$$

The strong solution mass fraction uncertainty, $u_{1x}$, is ±0.003 kg $NH_3$/kg solution.

$$C = \left(\frac{-x_2}{\dot{m}_5}\right) u_{2\dot{m}} \quad (12)$$

The weak solution mass flow rate uncertainty, $u_{2m}$, is ±0.07 grams/minute.

$$D = \left(\frac{-\dot{m}_2}{\dot{m}_5}\right) u_{2x} \quad (13)$$

The weak solution mass fraction uncertainty, $u_{2x}$, is ±0.003 kg $NH_3$/kg solution.

$$E = -\left(\frac{\dot{m}_1 x_1 - \dot{m}_2 x_2}{\dot{m}_5^2}\right) u_{5\dot{m}} \quad (14)$$

The refrigerant mass flow rate uncertainty, $u_{5m}$, is ±0.1 grams/minute.

The terms defined in Equations (11), (13), and (14) were determined to be the largest contributors to the refrigerant mass fraction uncertainty. A small refrigerant mass flow rates leads to a large uncertainty; therefore, one goal of the test plan was to increase this rate. In addition, high refrigerant mass fractions, above 85% ammonia, are desired. These conditions lead to the process plan stated in Table 6.

TABLE 6

| | Heat Flux (W/cm²) | | | | |
| --- | --- | --- | --- | --- | --- |
| | 4 | 5 | 6 | 7 | 8 |
| 8 grams/minute | ✓ | ✓ | | OVERHEAT | LIMIT |
| 12 grams/minute | ✓ | ✓ | ✓ | | |
| 16 grams/minute | | ✓ | ✓ | ✓ | |
| 20 grams/minute | UN-CERTAINTY | LIMIT | ✓ | ✓ | ✓ |

Initially the pressure in the bladder tank was adjusted 602, the needle valve 622 before the vapor receiving bag 624 closed, and the powered equipment turned on, with the exception of the heaters. The strong solution inlet flow was started and adjusted. The heaters were then turned on and increased incrementally to the desired power level. Once the pressure in the manifold rose to an appropriate level, vapor line 630 was opened and the weak solution exit flow rate adjusted. The vapor flow and weak solution flow rates were changed until a steady state was obtained. Data were acquired during the entire procedure. At the end of the procedure, the heaters were turned off first, then the flow.

Operation of the GC unit began with a warm up procedure to bring the GC unit up to the appropriate temperature, and to start the flow of gas. GC unit settings are listed in Table 7 for both liquid (calibration) and vapor cases.

TABLE 7

| | Gas Chromatograph Settings | | | | | |
| --- | --- | --- | --- | --- | --- | --- |
| Case | Oven Temp | Injection Temp | Detector Temp | Gas Flow Rate | Gas Pressure | Sample Size |
| Liquid | 100° C. | 200° C. | 200° C. | 33 cc/min | 100 kPa | 0.1 μl |
| Vapor | 80° C. | 150° C. | 200° C. | 33 cc/min | 100 kPa | 1 ml |

The vapor settings were suggested by the column vendor. The liquid settings were determined by experimentation.

Once the GC unit was up to temperature a run was initiated, and the sample was injected with a syringe through a septum. The integrator unit, which was connected directly to the detector, records the signal as the sample moves through the column, and determines the area percentages at the end.

Figure 22:
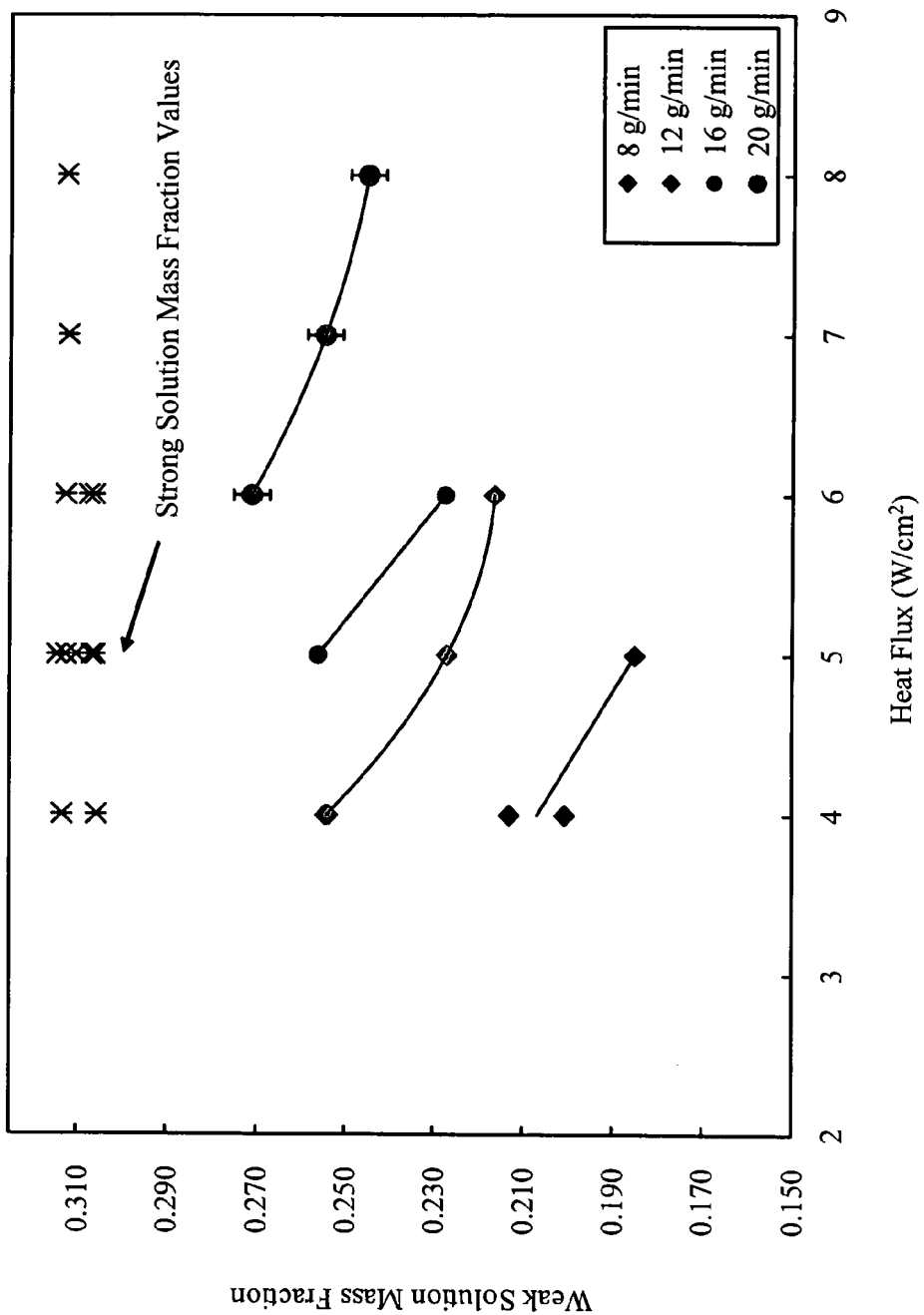
FIG. 22 is a graph of weak solution mass fraction versus heat flux as a function of strong solution flow rate.

A 1.4-inch-diameter, 800-μm thick, stainless steel, fractal-like desorber embodiment was used for all processes discussed in this section. FIG. 22 shows the weak solution mass fraction versus heat input as a function of the strong solution flow rate. The weak solution mass fractions are 21.5 to 39.5% smaller than the strong solution mass fractions, indicating desorption occurred. FIG. 22 shows for a given heat input, increasing the flow rate increases the weak solution mass fraction. Higher flow rates allow the fluid less time to heat up, providing less opportunity for the ammonia to evaporate. For a constant flow rate, FIG. 22 shows increasing heat flux decreases the weak solution mass fraction. The larger heat flux is better able to increase the fluid temperature to the level required for ammonia evaporation.

Figure 23:
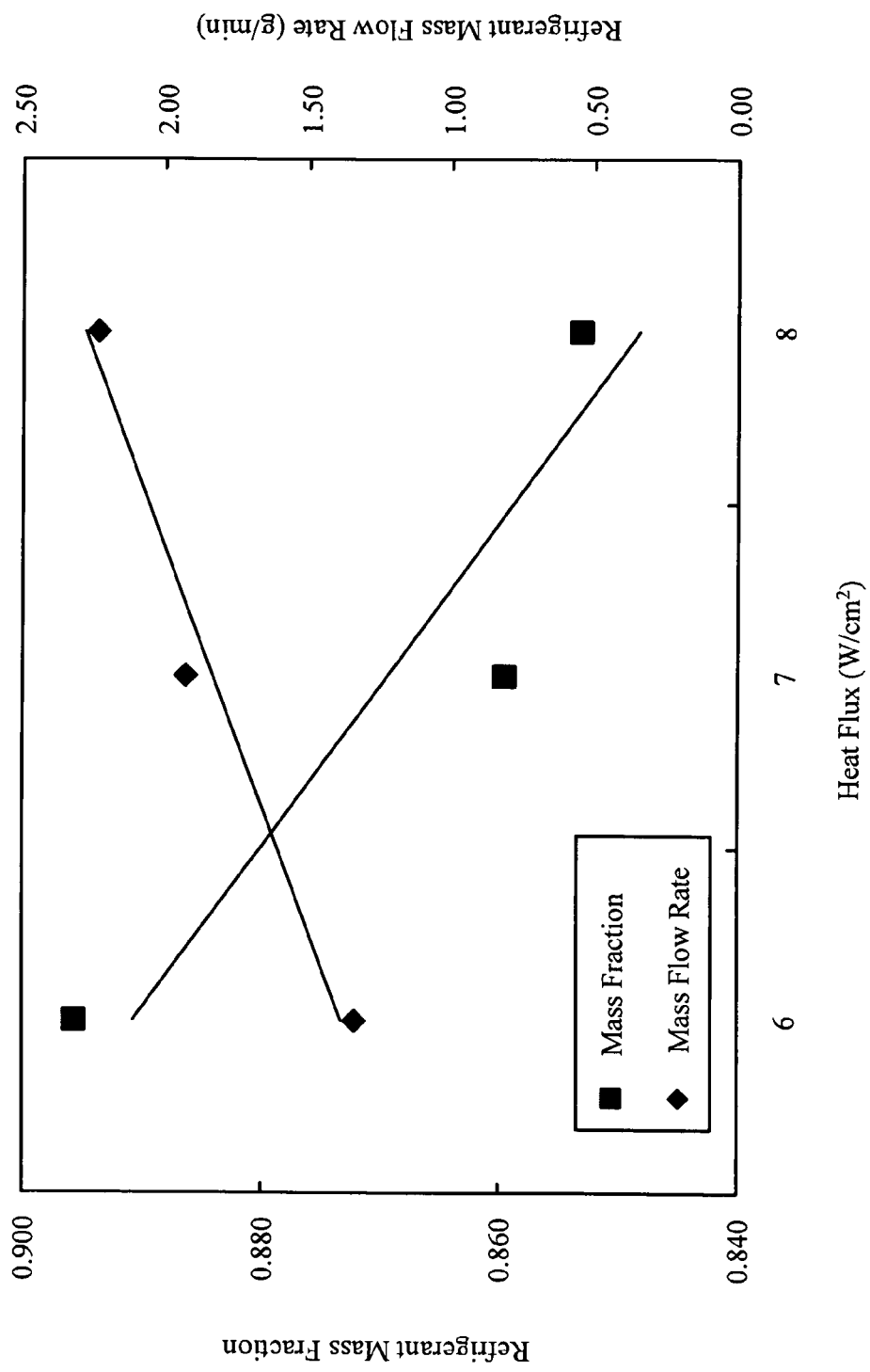
FIG. 23 is a graph of refrigerant mass fraction and mass flow rate versus heat flux for a strong solution mass flow rate of 20 grams/minute.

The refrigerant mass fraction and mass flow rate for a variety of heat inputs as a function of a 20 grams/minute strong solution flow rate are shown in FIG. 23. The refrigerant mass fraction decreases with increasing heat flux. Higher heat inputs result in a higher operating temperature and the evaporation of water along with the ammonia. The refrigerant mass flow rate increases with increasing heat flux, the higher operating temperature evaporating more of both components.

The refrigerant mass fractions obtained for a strong solution flow rate of 20 grams/minute and increasing heat flux are compared to theoretical predictions. Using the data acquired when the system was assumed to be at equilibrium, the fractal temperature and manifold pressure were applied to the equilibrium model. The predicted refrigerant mass fractions were compared with the experimental values. The theoretical and experimental data show that at a constant flow the refrigerant mass fraction decreases with increasing heat flux. The theory over predicts the experimental values by less than 6%. The fractal temperature was used to calculate the refrigerant mass fraction. A thermocouple located on the top surface of the fractal on the outside circumference of the device was used to determine the fractal temperature. This temperature is a good approximation of the equilibrium temperature but obviously is not exact.

Figure 24:
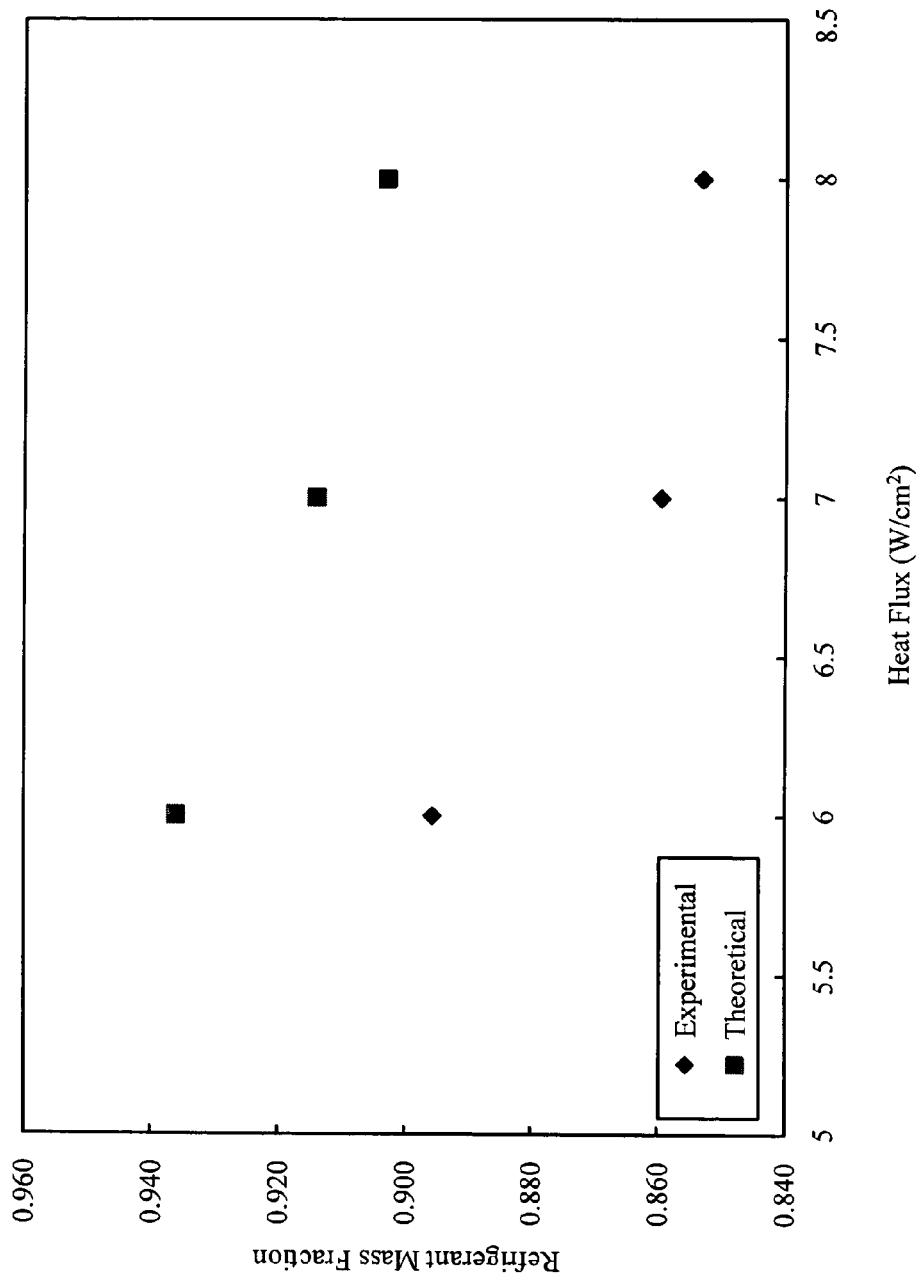
FIG. 24 is a graph of experimental and theoretical refrigerant mass fraction versus heat flux for a strong solution mass flow rate of 20 grams/minute.
Figure 25:
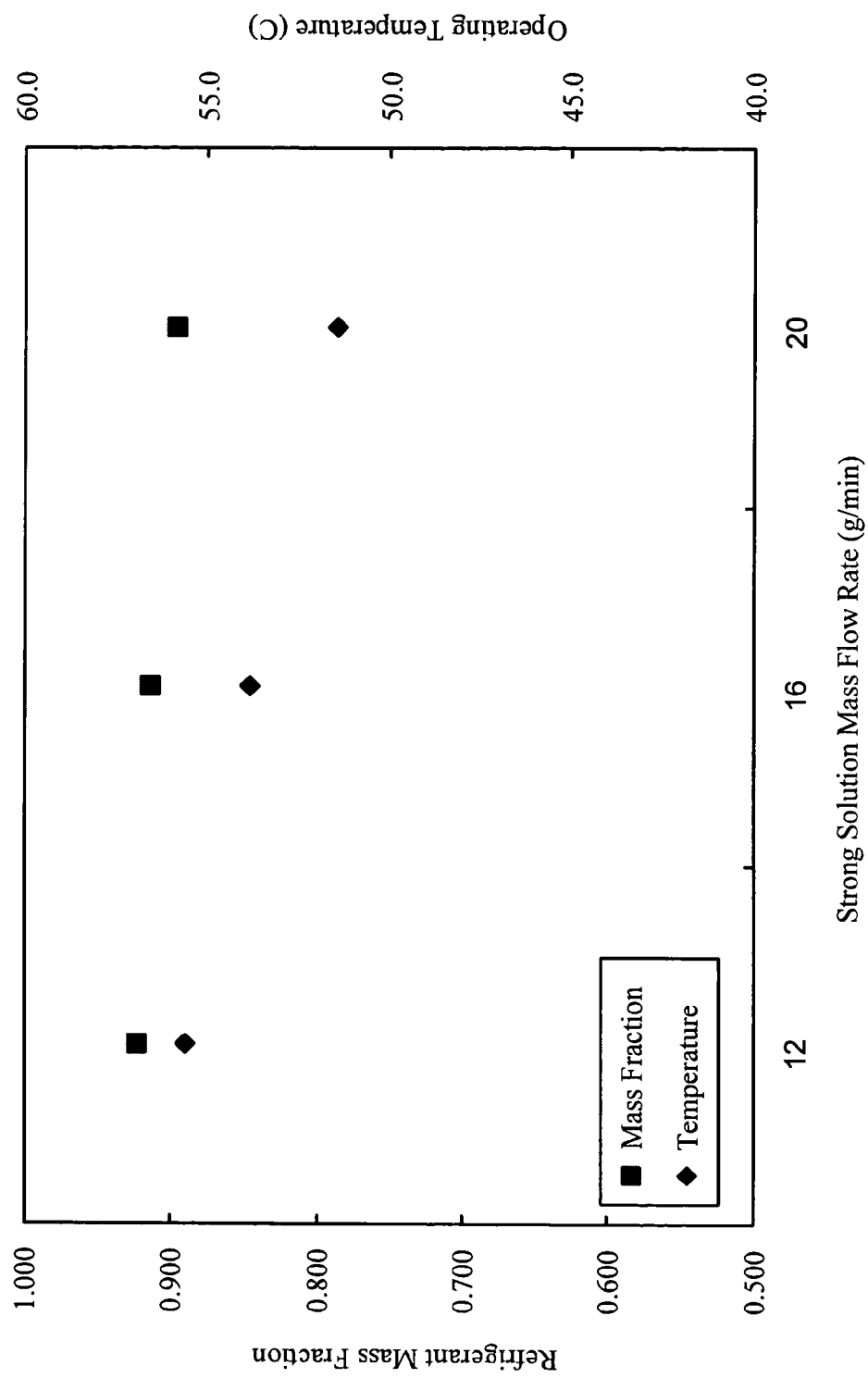
FIG. 25 is a graph of refrigerant mass fraction and desorber operating temperature versus strong solution mass flow rate.

The refrigerant mass fraction and desorber operating temperature at different heat fluxes and several different strong solution mass flow rates are shown in FIGS. 24 and 25, respectively. Refrigerant mass fractions greater than 90% can be obtained for all flow rates. For all strong solution flow rates these high refrigerant mass fractions were obtained with desorber operating temperatures between 50 and 55° C. As the strong solution mass flow rate increases the desorber operating temperatures decrease due to limitations of the off-the-shelf, thin film heaters. The lower operating temperature results in a lower refrigerant mass fraction, limiting the strong solution flow rate that can be used given the current heaters.

The proposed ammonia-water desorber/separator using a fractal-like branching microchannel network desorber was designed, manufactured and tested. Desorption was clearly demonstrated. A parametric study, where energy input and strong solution mass flow rate were varied, was performed. Refrigerant mass fractions exceeding 90% were obtained, as were refrigerant mass flows of 2.25 grams/minute. A trade off between high refrigerant mass fractions and large refrigerant mass flow rates was shown. Problems with pressure fluctuations and dry out did not occur.

V. Application Examples

The development of compact absorbers and desorbers creates opportunities for many new applications of heat actuated heat pumps. The potential environmental benefits associated with two of these applications, compact thermally activated heat pumps for space heating and cooling, and automotive cab cooling, are estimated below.

The successful development of the microchannel desorber will have two environmental impacts. First, replacing conventional vapor compression cycle cooling units in space cooling and automotive applications will eliminate the use of CFC and HCFC refrigerants in these applications. The microtechnology-based, absorption heat pump uses ammonia for the refrigerant. The use of microchannel components results in an extremely small inventory of ammonia vapor being available for discharge to the surroundings. Most of the ammonia inventory in a microtechnology-based, absorption heat pump is aqueous ammonia.

The second and more important environmental impact is on energy consumption where the availability of a small, distributed-heat-actuated heat pump allows new approaches to cooling. As discussed below, the development of a micro-technology-based absorption heat pump could result in a reduction in annual energy consumption in the U.S. of approximately $8.4 \times 10^{12}$ kW-hr of energy. This represents a cost savings of perhaps $25 billion per year with the associated reduction in the use of fossil fuel. To the extent that primary energy consumption is reduced, emission of green house gases (carbon dioxide), particulate and other combustion products also is reduced.

1. Building Space Heating and Cooling

Compact absorption heat pumps serving individual rooms have the potential to significantly reduce energy consumption compared to central HVAC systems coupled with ducted conditioned air distribution. Energy losses in ducting occur because of leaks and heat transfer through duct walls. These losses vary significantly depending on design, installation, and maintenance practices, but have been estimated to range from 20-40% of energy entering the ducting system (ASHRAE 1996; Andrews and Modera 1991). Smaller (collectively, as well as individually) heat pumps also should reduce cycling losses associated with the repeated heating and cooling of HVAC equipment. Finally, distributed heat pumps allow better control of individual room temperatures, which also should reduce the required load.

Admittedly, there is uncertainty in the magnitude of savings possible from the above mechanisms. Ducting conditions vary widely. Losses from ducts within the conditioned space boundary provide an indirect heating and cooling benefit. Reduced cycling losses and zone control benefits also are highly variable and poorly documented. The following analysis assumes the combined benefit of avoiding duct losses, reducing cycling losses, and achieving better zone control result in a net 25% reduction in building space heating and cooling load. Additional savings result from differences in the efficiency of an absorption heat pump compared to the systems it would replace.

Compact absorption heat pumps would be applied most beneficially as an alternative to ducted systems, where the ducts are outside the conditioned space and where rooms have exterior walls that allow easy access to ambient air (for use as the heat source/sink). These conditions are most prevalent in residential buildings, but are also common in smaller commercial buildings. The following analysis focuses on the larger residential market.

According to the 1997 Residential Energy Consumption Survey (RECS), 56.6 million households were served by central (ducted) warm-air furnace systems. These systems consumed $9.7 \times 10^{12}$ kW-hr of energy (mostly natural gas and fuel oil) at a cost of $24.53 billion. The efficiency of a typical central furnace is assumed to be about 80%, while the Coefficient of Performance (COP) of an absorption heat pump is estimated to be about 1.2. Thus, the 25% savings associated with ducting losses, etc., coupled with the increase in equipment efficiency, would combine to cut energy use in half, resulting in energy savings of $4.85 \times 10^{12}$ kW-hr valued at $12.26 billion per year.

Central (ducted) heat pumps provided heating for 9.7 million households according to the 1997 RECS. These electrically-driven devices consumed $0.4 \times 10^{12}$ kW-hr (measured at the site) at a cost of $2.64 billion. According to figures presented in the 1997 Annual Energy Review, the combined conversion, transmission, and distribution efficiency for electricity was 30%. Thus, $0.4 \times 10^{12}$ kW-hr at the site is equivalent to $1.25 \times 10^{12}$ kW-hr at the source. Assuming a COP of 2.5 for an electrically-driven heat pump (compared to a COP of 1.2 for the absorption heat pump) and 25% savings for reduced ducting losses, etc., site energy use would increase from $0.4 \times 10^{12}$ kW-hr to $0.6 \times 10^{12}$ kW-hr. The absorption heat pump is not electrically-driven, so site and source energy are the same. Thus, the net source energy savings are $0.67 \times 10^{12}$ kW-hr per year. The cost of $0.6 \times 10^{12}$ kW-hr of fossil energy in the residential sector (based on RECS data for space heating) would be $1.50 billion, resulting in net energy dollar savings of $1.14 billion per year.

Central (ducted) air conditioning systems (via heat pumps or AC only systems) were used in 47.5 million households according to the 1997 RECS, consuming $1.0 \times 10^{12}$ kW-hr of electricity (measured at the site) at a cost of $8.26 billion. This is equivalent to $3.3 \times 10^{12}$ kW-hr of source energy when energy electricity generation, transmission, and distribution losses are included. The absorption heat pump COP is only expected to be 0.65 in the cooling mode, compared to an assumed COP of 2.5 for the electrically-driven heat pump. Nevertheless, when coupled with 25% load savings for reduced ducting losses, etc., source energy consumption for the absorption heat pump is only $2.8 \times 10^{12}$ kW-hr, resulting in annual energy savings of $0.43 \times 10^{12}$ kW-hr. The $2.8 \times 10^{12}$ kW-hr of fossil energy is estimated to cost $7.26 billion in the residential sector (based on RECS data for space heating), resulting in annual dollar savings of $1.0 billion.

The combined annual savings for central (ducted) heating and cooling systems are $6.0 \times 10^{12}$ kW-hr (source energy) and $14.4 billion. Site energy savings were estimated to be $1.37 \times 10^{12}$ kW-hr of electricity and $1.4 \times 10^{12}$ kW-hr of fossil energy. The latter is roughly 80% natural gas and 20% fuel oil.

2. Automotive Cab Cooling

Air conditioning of automobiles currently is accomplished with vapor compression devices that are driven by shaft power generated by the auto's engine. With an IC engine efficiency of about 20% and an automotive vapor compression COP of 0.8, overall efficiency is poor. Absorption coolers offer significant performance improvement by avoiding the inefficiencies of IC engine shaft power. Conventional absorption-based cooling systems are too bulky for the automotive application, however, so development of a compact absorption cooling system is required to take advantage of the efficiency improvement opportunity.

According to the Transportation Energy Data Book (Davis 1998), 130 million cars were driven 1.47 trillion miles or an average of 11,314 miles per car. The average speeds for the federal urban and highway driving cycles are 20 mph and 50 mph, respectively. Assuming that half of the annual mileage is accumulated at the urban rate and half at the highway rate, the total annual driving hours would be about 400. The number of air-conditioned driving hours would depend on climate and typical driving schedules. Lacking better data, air conditioning was assumed to be required half of the time.

A passenger car cooling system is commonly sized to provide up to 2 tons (7.0 kW) of cooling. The cooling unit operates at capacity when bringing a car down from a "hot soak" condition to a comfortable operating temperature. At steady-state the required cooling capacity is much lower. This analysis assumes the air conditioner operates at full capacity for 20% of the cooling hours, but only 20% of capacity for the rest of the cooling hours, for an average capacity factor of 0.36 or average capacity of 0.72 tons or 2.53 kW. Thus, the annual average cooling load served by the air conditioning system is 506 kW-hr.

With an IC engine efficiency of 0.20 and vapor compression COP of 0.8, the conventional automotive AC system consumes 3164 kW-hr/year in the form of gasoline. The absorption cooler COP is estimated to be 0.5 in the automotive application. Its COP for the automotive application is less than for the space cooling application because the automotive condensing temperatures are generally higher. Although IC engine waste heat could provide part of the thermal input to the absorption cooler, the quantity available is not always adequate. This analysis makes the conservative assumption that all of the thermal input for the absorption cooler comes from combusting gasoline in a micro-channel combustor at an efficiency of 80% (i.e., 80% of the fuel's chemical energy is converted and transferred to the absorption cooler). Thus, the annual energy consumption for the absorption cooler is 1266 kW-hr/year or a savings of 1899 kW-hr/year. This is equivalent to 52 gallons of gasoline per year or a dollar savings of about $78 per year.

If applied to the population of automobiles (130 million passenger cars), the total annual savings would be $2.54 \times 10^{12}$ kW-hr and $10.1 billion. These figures do not include the potential impact of 69 million light trucks (pickups, vans, and utility vehicles). Nor do these figures consider the potential impact of enabling air conditioning in future electric, fuel cell, or hybrid vehicles where the shaft power demand of a conventional vapor compression unit would be significant.

Nomenclature and Abbreviations

Certain abbreviations, terms and symbols are used in this disclosure and drawings. Unless otherwise noted, such as abbreviations, terms and symbols are as indicated below.
h specific enthalpy (kJ/kg)
$\dot{m}$ mass flow rate (kg/s)
P pressure (kPa), or electrical power (to resistance heaters)
$\dot{Q}$ heat rate (W)
T temperature (° C.)
t time (s)
x percent LiBr concentration by mass Greek Symbols
Δ differential
μ dynamic viscosity (kg/ms)
ρ density Subscripts
d desorber
elec electrical
f fluid
ref refrigerant (in the case of LiBr—$H_2O$ mixture the refrigerant is $H_2O$)
in inlet
μchnl microchannel
o, out exit
s solution
sat saturation state
t theoretical
v vapor The present invention has been described with reference to certain illustrative embodiments. A person of ordinary skill in the art will appreciate that the scope of the present invention is not limited to the illustrated embodiments.

We claim:

1. A droplet desorption process, comprising:
providing a droplet desorber comprising plural, substantially straight, substanially parallel microchannels or a fractal plate;
feeding a mixture comprising at least a first fluid and a second fluid to the desorber; and
performing droplet desorption on the mixture using the desorber.

2. The process according to claim 1 wherein the desorber includes mirochannels that facilitate fluid slug flow.

3. The process according to claim 2 where the microchannels have substantially equal dimensions.

4. The process according to claim 2 where the microchannels have substantially equal heights and widths.

5. The method according to claim 1 comprising a bifurcating channel fractal plate.

6. The method according to claim 1 further comprising separating the first fluid from the second fluid using a process selected from the group consisting of gravity separation, wicking separation, electro hydrodynamic separation, centrifugal separation, cyclone separation, and combinations thereof.

7. The method according to claim 1 where the mixture is selected from the group consisting of ammonia and water; lithium bromide and water; lithium bromide, zinc bromide and methanol; sodium hydroxide and water; lithium chloride and water; lithium nitrate, potassium nitrate, sodium nitrate and water; and combinations thereof.

8. The method according to claim 1 where the mixture comprises ammonia and water.

9. The method according to claim 1 where the mixture comprises lithium bromide and water.

10. The method according to claim 1 where the mixture comprises lithium bromide, ammonia and water.

11. A cooling desorption process, comprising:
providing a droplet desorber comprising plural, substantially straight, substantially parallel microchannels or a fractal plate;
feeding a mixture to the desorber comprising a first fluid and a second fluid, the mixture being selected from the group consisting of ammonia and water; lithium bromide and water; lithium bromide, zinc bromide and methanol; sodium hydroxide and water; lithium chloride and water; lithium nitrate, potassium nitrate, sodium nitrate and water; and combinations thereof; and
performing droplet desorption on the mixture using the desorber and separating the first fluid from the second fluid using a process selected from the group consisting of gravity separation, wicking separation, electro hydrodynamic separation, centrifugal separation, cyclone separation, and combinations thereof.

12. A droplet desorption process, comprising:
providing a droplet desorber having a microchannel geometry that facilitates droplet desorption;
feeding a fluid mixture to the desorber; and performing droplet desorption on the mixture using the desorber.

13. The process according to claim 12 where the desorber comprises plural, substantially straight, substantially parallel microchannels.

14. The process according to claim 12 wherein the desorber includes microchannels that facilitate fluid slug flow.

15. The process according to claim 12 where the microchannels have substantially equal dimensions.

16. The process according to claim 15 where the microchannels have substantially equal heights and widths.

17. The method according to claim 13 where the desorber comprises a fractal plate.

18. A system, comprising:
a substantially straight, substantially parallel microchannel array or a fractal plate desorber, the array and fractal plate having channel geometries that facilitate droplet desorption;
a manifold positioned to deliver multiple component fluids comprising a refrigerant to the desorber;
a heater operatively associated with the desorber; and
a separator downstream of the desorber for separating a refrigerant vapor from a liquid fraction remaining from the mixture following vaporization of the refrigerant.

19. The system according to claim 18 further comprising an expansion valve through which the refrigerant flows, where the pressure is reduced and the refrigerant boils at a Low temperature.

20. The system according to claim 18 where the heater is a thin film heater.

21. The system according to claim 20 where the heater comprises nichrome.

22. The system according to claim 18 where the separator is selected from the group consisting of a gravity separator, a wicking separator, an electro hydrodynamic separator, a centrifugal separator, a cyclone separator, and combinations thereof.

23. The system according to claim 18 where the multiple component fluid is selected from the group consisting of ammonia and water; lithium bromide and water; lithium bromide, zinc bromide and methanol; sodium hydroxide and water; lithium chloride and water; lithium nitrate, potassium nitrate, sodium nitrate and water; and combinations thereof.

24. The system according to claim 18 where the multiple component fluid comprises ammonia and water.

25. The system according to claim 18 where the multiple component fluid comprises lithium bromide and water.

26. The system according to claim 18 where the multiple component fluid comprises lithium bromide, ammonia and water.

27. The system according to claim 24 where the desorber is constructed from a material substantially noncorrosive to ammonia.

28. The system according to claim 27 where the desorber is constructed from stainless, steel.

29. The system according to claim 28 where the desorber is constructed from stainless 304, 314, or 316, and combinations thereof.

* * * * *